US012063627B2

(12) United States Patent
Wang et al.

(10) Patent No.: US 12,063,627 B2
(45) Date of Patent: Aug. 13, 2024

(54) ENHANCED SIDELINK RESOURCE POOLS

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/529,630

(22) Filed: Nov. 18, 2021

(65) Prior Publication Data

US 2023/0156663 A1    May 18, 2023

(51) Int. Cl.
*H04W 72/02* (2009.01)
*H04L 1/1607* (2023.01)
*H04W 28/26* (2009.01)
*H04W 72/0446* (2023.01)
*H04W 72/0453* (2023.01)

(52) U.S. Cl.
CPC .......... *H04W 72/02* (2013.01); *H04L 1/1614* (2013.01); *H04W 28/26* (2013.01); *H04W 72/0446* (2013.01); *H04W 72/0453* (2013.01)

(58) Field of Classification Search
CPC . H04W 72/02; H04W 28/26; H04W 72/0446; H04W 72/0453
See application file for complete search history.

(56) References Cited

U.S. PATENT DOCUMENTS

| | | | |
|---|---|---|---|
| 11,533,745 B2* | 12/2022 | Hong | H04L 1/0041 |
| 2021/0014831 A1* | 1/2021 | Ryu | H04W 72/02 |
| 2022/0225292 A1* | 7/2022 | Mohammad Soleymani | H04W 72/20 |
| 2022/0264554 A1* | 8/2022 | Hui | H04W 4/02 |
| 2022/0361069 A1* | 11/2022 | Zhang | H04W 72/23 |

* cited by examiner

*Primary Examiner* — Michael A Keller
(74) *Attorney, Agent, or Firm* — Holland & Hart LLP

(57) ABSTRACT

Methods, systems, and devices for wireless communications are described. Aspects of the present disclosure provide a user equipment (UE) with a capability to identify an enhanced sidelink resource pool including resources that are otherwise excluded from configured sidelink resource pools. In some examples, the UE may identify the enhanced sidelink resource pool based on sidelink parameters for transmitting one or more sidelink messages, and the UE may use the enhanced sidelink resource pool for additional sidelink transmissions. The additional sidelink transmissions may include standalone sidelink control information (SCI) transmissions or other types of transmissions associated with sidelink communications. The resources associated with the enhanced sidelink resource pool may have a relatively finer granularity than those included within a base sidelink resource pool that is, for example, configured by a network.

30 Claims, 14 Drawing Sheets

ENHANCED SIDELINK RESOURCE POOLS

FIELD OF TECHNOLOGY

The following relates to wireless communications, including enhanced sidelink resource pools.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems UEs may communicate with one or more other UEs using sidelink communication links. In such cases, time/frequency resources may be selected from resource pools for transmitting messages between the UEs. In some cases, however, a UE may be excluded from utilizing one or more resources from the sidelink resource pools based on rules associated with the resources, resulting in wasted resources and an overall decrease in network efficiency.

SUMMARY

The described techniques relate to improved methods, systems, devices, and apparatuses that support enhanced sidelink resource pools. Generally, the described techniques provide a user equipment (UE) with a capability to identify an additional resource pool (e.g., an enhanced sidelink resource pool) including resources that are otherwise excluded from configured resource pools, where the UE may use the additional resource pool for additional sidelink transmissions. These additional sidelink transmissions may include standalone sidelink control information (SCI) transmissions or other types of transmissions (e.g., channel state information (CSI), scheduling request (SR), buffer status report (BFR)). Such techniques may enable the use of sidelink resources that would otherwise be inaccessible to the UE. Additionally, these sidelink resources may have a relatively finer granularity than those included within a base resource pool (e.g., as configured by a network), thereby reducing occurrences of wasted resources and increasing system efficiency.

A method for wireless communications at a first UE is described. The method may include receiving a first control message indicating a configuration of a first set of sidelink parameters for transmitting one or more sidelink messages, identifying a base sidelink resource pool for transmitting the one or more sidelink messages, identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters, and transmitting the one or more additional sidelink messages on resources selected from the enhanced sidelink resource pool.

An apparatus for wireless communications at a first UE is described. The apparatus may include a processor, memory coupled with the processor, and instructions stored in the memory. The instructions may be executable by the processor to cause the apparatus to receive a first control message indicating a configuration of a first set of sidelink parameters for transmitting one or more sidelink messages, identify a base sidelink resource pool for transmitting the one or more sidelink messages, identify an enhanced sidelink resource pool that is different from the base sidelink resource pool, the enhanced sidelink resource pool for transmitting one or more additional sidelink messages, where the enhanced sidelink resource pool is identified based on the first set of sidelink parameters, and transmit the one or more additional sidelink messages on resources selected from the enhanced sidelink resource pool.

Another apparatus for wireless communications at a first UE is described. The apparatus may include means for receiving a first control message indicating a configuration of a first set of sidelink parameters for transmitting one or more sidelink messages, means for identifying a base sidelink resource pool for transmitting the one or more sidelink messages, means for identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters, and means for transmitting the one or more additional sidelink messages on resources selected from the enhanced sidelink resource pool.

A non-transitory computer-readable medium storing code for wireless communications at a first UE is described. The code may include instructions executable by a processor to receive a first control message indicating a configuration of a first set of sidelink parameters for transmitting one or more sidelink messages, identify a base sidelink resource pool for transmitting the one or more sidelink messages, identify an enhanced sidelink resource pool that is different from the base sidelink resource pool, the enhanced sidelink resource pool for transmitting one or more additional sidelink messages, where the enhanced sidelink resource pool is identified based on the first set of sidelink parameters, and transmit the one or more additional sidelink messages on resources selected from the enhanced sidelink resource pool.

In some examples of the method, apparatuses, and non-transitory computer-readable medium described herein, transmitting the one or more additional sidelink messages may include operations, features, means, or instructions for transmitting a second control message on one or more resources selected from the enhanced sidelink resource pool, the second control message being associated with one or more resources in the base sidelink resource pool, where the second control message indicates an index of the base sidelink resource pool.

Some examples of the method, apparatuses, and non-transitory computer-readable medium described herein may further include operations, features, means, or instructions for receiving a third control message granting access to the enhanced sidelink resource pool, where transmitting the one or more additional sidelink messages may be based on the third control message granting access to the enhanced sidelink resource pool.

Some examples of the method, apparatuses, and non-transitory computer-readable medium described herein may further include operations, features, means, or instructions for transmitting a fourth control message that reserves the resources selected from the enhanced sidelink resource pool, where transmitting the one or more additional sidelink messages may be based on reserving the resources selected from the enhanced sidelink resource pool.

In some examples of the method, apparatuses, and non-transitory computer-readable medium described herein, the fourth control message may be transmitted on one or more resources of the base sidelink resource pool, or one or more resources of the enhanced sidelink resource pool, or any combination thereof.

Some examples of the method, apparatuses, and non-transitory computer-readable medium described herein may further include operations, features, means, or instructions for identifying one or more subsets of sidelink resources within the enhanced sidelink resource pool, where each subset of sidelink resources of the one or more subsets of sidelink resources may be associated with an index.

Some examples of the method, apparatuses, and non-transitory computer-readable medium described herein may further include operations, features, means, or instructions for performing a channel access procedure prior to transmitting the one or more additional sidelink messages, where transmitting the one or more additional sidelink messages may be based on the channel access procedure being successful.

Some examples of the method, apparatuses, and non-transitory computer-readable medium described herein may further include operations, features, means, or instructions for identifying a bitmap that indicates one or more resources that may be excluded from the enhanced sidelink resource pool, where the resources selected from the enhanced sidelink resource pool may be based on the one or more excluded resources.

Some examples of the method, apparatuses, and non-transitory computer-readable medium described herein may further include operations, features, means, or instructions for identifying a second set of sidelink parameters associated with transmitting the one or more additional sidelink messages using the enhanced sidelink resource pool, where the second set of sidelink parameters configure a format of the one or more additional sidelink messages, a starting symbol of the one or more additional sidelink messages, or a threshold number of symbols in a slot for the one or more additional sidelink messages, or any combination thereof.

In some examples of the method, apparatuses, and non-transitory computer-readable medium described herein, the identifying the enhanced sidelink resource pool may be based on a coverage status of the UE, or a type of the UE, or a capability of the UE, or any combination thereof.

Some examples of the method, apparatuses, and non-transitory computer-readable medium described herein may further include operations, features, means, or instructions for identifying a transmission configuration from a set of one or more transmission configurations for transmitting the one or more additional sidelink messages on the resources selected from the enhanced sidelink resource pool, each transmission configuration of the set of one or more transmission configurations including one or more resource patterns for the resources selected from the enhanced sidelink resource pool, where transmitting the one or more additional sidelink messages may be based on the identified transmission configuration.

Some examples of the method, apparatuses, and non-transitory computer-readable medium described herein may further include operations, features, means, or instructions for receiving a fifth control message indicating a format of the one or more additional sidelink messages, or a type of the one or more additional sidelink messages, or any combination thereof, where transmitting the one or more additional sidelink messages may be based on the format of the one or more additional sidelink messages, or the type of the one or more additional sidelink messages, or any combination thereof.

Some examples of the method, apparatuses, and non-transitory computer-readable medium described herein may further include operations, features, means, or instructions for identifying a set of one or more sidelink resources from the base sidelink resource pool based on the first set of sidelink parameters, the set of one or more sidelink resources being unavailable for sidelink shared channel transmissions and transmitting the one or more additional sidelink messages on resources selected from the set of one or more sidelink resources.

Some examples of the method, apparatuses, and non-transitory computer-readable medium described herein may further include operations, features, means, or instructions for receiving, on resources associated with the base sidelink resource pool, a sixth control message reserving the set of one or more sidelink resources for the one or more additional sidelink messages, where the set of one or more sidelink resources may be identified based on the sixth control message reserving the set of one or more sidelink resources.

In some examples of the method, apparatuses, and non-transitory computer-readable medium described herein, the set of one or more sidelink resources may have a periodicity associated with a sidelink feedback channel.

Some examples of the method, apparatuses, and non-transitory computer-readable medium described herein may further include operations, features, means, or instructions for identifying a set of resources configured for transmitting one or more sidelink control messages, where the set of resources may be identified based on the base sidelink resource pool, or the enhanced sidelink resource pool, or any combination thereof and transmitting the one or more sidelink control messages on the set of resources.

Some examples of the method, apparatuses, and non-transitory computer-readable medium described herein may further include operations, features, means, or instructions for receiving an indication of a bitmap that indicates the set of resources associated with transmitting the one or more sidelink control messages, the set of resources being excluded from the base sidelink resource pool, where the set of resources may be identified based on the bitmap.

Some examples of the method, apparatuses, and non-transitory computer-readable medium described herein may further include operations, features, means, or instructions for receiving an indication of a bitmap that indicates the set of resources associated with transmitting the one or more sidelink control messages, the set of resources including a subset of resources from the base sidelink resource pool, where the set of resources may be identified based on the bitmap.

In some examples of the method, apparatuses, and non-transitory computer-readable medium described herein, a sidelink control message of the one or more sidelink control messages includes a bitmap indicating time domain resources, frequency domain resources, a resource periodicity, or any combination thereof, the sidelink control message provides control information associated with resources in the base sidelink resource pool, in a third sidelink resource pool, or any combination thereof, based on the bitmap.

In some examples of the method, apparatuses, and non-transitory computer-readable medium described herein, the one or more additional sidelink messages include a sidelink data transmission, a frame structure includes the resources selected from the enhanced sidelink resource pool and one or more resources from the base sidelink resource pool.

In some examples of the method, apparatuses, and non-transitory computer-readable medium described herein, the enhanced sidelink resource pool includes a first set of one or more sidelink resources and a second set of one or more sidelink resources, the first set of one or more sidelink resources includes one or more slots excluded from the base sidelink resource pool, and the second set of one or more sidelink resources includes one or more symbols of a slot that may be excluded from the base sidelink resource pool.

In some examples of the method, apparatuses, and non-transitory computer-readable medium described herein, the one or more additional sidelink messages include sidelink control information, a repetition of sidelink control information, a channel state information report, a scheduling request, a buffer status report, a discovery message, a link recovery request, a feedback message, a UE-coordination message, a group reservation, or any combination thereof.

In some examples of the method, apparatuses, and non-transitory computer-readable medium described herein, the first set of sidelink parameters includes at least a first parameter and a second parameter, the first parameter indicates a starting symbol used for transmitting the one or more sidelink messages in a slot and the second parameter indicates a number of symbols for transmitting the one or more sidelink messages in the slot.

DETAILED DESCRIPTION

Figure 1:
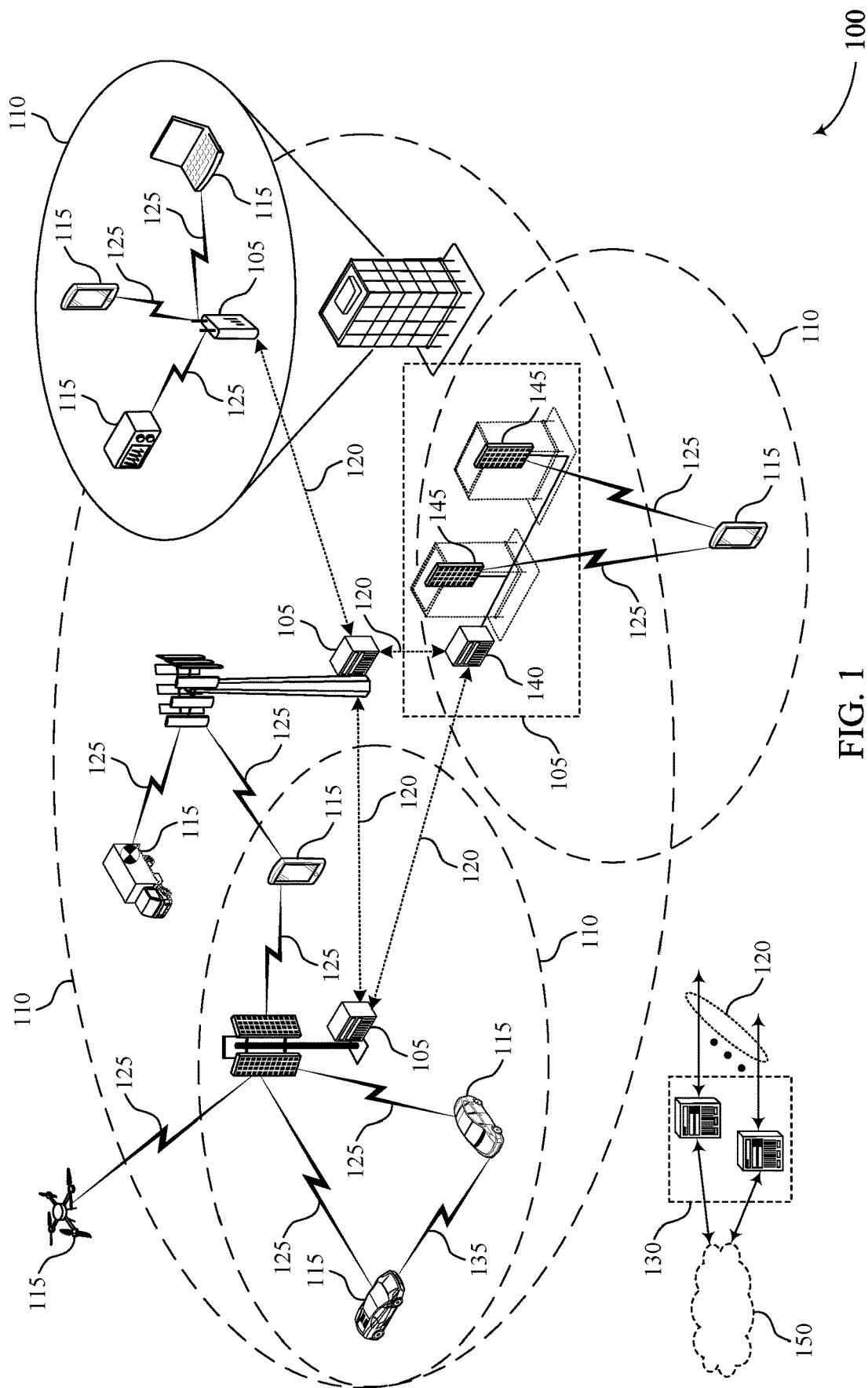
FIG. 1 illustrates an example of a wireless communications system that supports enhanced sidelink resource pools in accordance with aspects of the present disclosure.

Some wireless communication systems, such as fifth generation (5G) New Radio (NR) systems, may support wireless devices establishing an access link (e.g., a Uu interface) or a sidelink (e.g., a PC5 interface), or both. For example, a user equipment (UE) may establish an access link with a base station and a sidelink (e.g., a sidelink communication link) with another UE. In some cases, a UE may establish an access link with a base station and may establish a sidelink with another UE which may operate as a relay (e.g., which has an access link with the same or different base station as the UE) such that the UE may communicate with a network via the access link or the sidelink, or both. Sidelink communications may be referred to as vehicle-to-vehicle (V2V) communications, vehicle-to-everything (V2X) communications, device-to-device (D2D) communications, or other terminology.

In some examples, sidelink resource pools may be used by UEs for communicating with one or more other UEs. Specifically, one or more resources may be selected from a configured pool of resources. The resource pools may be configured by a base station or may be preconfigured, where the UE dynamically selects resources from the preconfigured resource pools. In some cases, however, the UE may be excluded from utilizing one or more resources (e.g., symbols, slots) that are excluded from the sidelink resource pools. In other examples, various rules associated with the sidelink resources may prohibit the UE from using resources from a resource pool. For example, based on a configuration of a starting symbol in a slot and a number of symbols in the slot allocated for sidelink transmissions, multiple symbols within the slot, or even an entire slot, may be excluded from being used for sidelink transmission. The inability to use these resources for sidelink transmissions may result in wasted resources and an overall decrease in network efficiency, among other issues.

Aspects of the present disclosure describe techniques for one or more UEs to identify and utilize an additional resource pool (e.g., an enhanced sidelink resource pool) comprising resources that are otherwise excluded from configured resource pools for sidelink transmissions with one or more other UEs. In such cases, the UE may receive control signaling that provides a configuration of sidelink parameters (e.g., the starting symbol in a slot and the number of symbols in the slot allocated for sidelink transmissions), and may identify the enhanced sidelink resource pool based on the configured parameters). The additional sidelink transmissions on the resources of the enhanced sidelink resource pool may include standalone sidelink control information (SCI) transmissions or other types of transmissions (e.g., channel state information (CSI), scheduling request (SR), buffer status report (BFR), and the like). Such techniques may enable the use of sidelink resources that would otherwise be inaccessible to the UE, and these resources may have a finer granularity than those included within a base resource pool, thereby increasing system efficiency. A base resource pool may refer to a conventional sidelink resource pool that is configured by the network or preconfigured for sidelink communications over a sidelink communication link.

In some examples, the sidelink transmissions using the additional sidelink resource pool may be sent using various configurations having different patterns for the sidelink resources (e.g., occupying a full slot with varying levels of granularity, occupying a number of symbols before or after resources within a base resource pool). That is, the UE may identify a transmission configuration corresponding to the enhanced sidelink resource pool, where the transmission configuration may indicate one or more patterns associated with the enhanced sidelink resource pool. In some aspects, the enhanced sidelink resource pool may be accessed in various ways, for example, by way of an access grant from a base station, or by way of performing channel access procedures for reserving the resources in the additional sidelink resource pool. Further, some resources may be designated for sidelink control signaling, where these resources may be indicated by a bitmap and include resources that are excluded from a base resource pool or be a subset of resources within the base resource pool. In any case, the control signaling sent on these designated resources may provide standalone control signaling for one or more resource pools.

Aspects of the disclosure are initially described in the context of wireless communications systems. Aspects of the disclosure are further illustrated by and described with reference to resource configurations and process flows. Aspects of the disclosure are further illustrated by and described with reference to apparatus diagrams, system diagrams, and flowcharts that relate to enhanced sidelink resource pools.

FIG. 1 illustrates an example of a wireless communications system 100 that supports enhanced sidelink resource pools in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support techniques for identifying an enhanced resource pool including resources that are otherwise excluded from configured resource pools (e.g., base sidelink resource pools). In some examples, the UE may identify the enhanced sidelink resource pool based on sidelink parameters for transmitting one or more sidelink messages, and the UE 115 may use the enhanced resource pool for additional sidelink transmissions. These enhanced sidelink transmissions may include standalone SCI transmissions or other types of transmissions (e.g., CSI, SR, BFR). Such techniques may enable the use of sidelink resources that would otherwise be inaccessible to the UE 115. Additionally, these resources may have a finer granularity than those included within a base resource pool, thereby reducing occurrences of wasted resources and increasing system efficiency.

Figure 2:
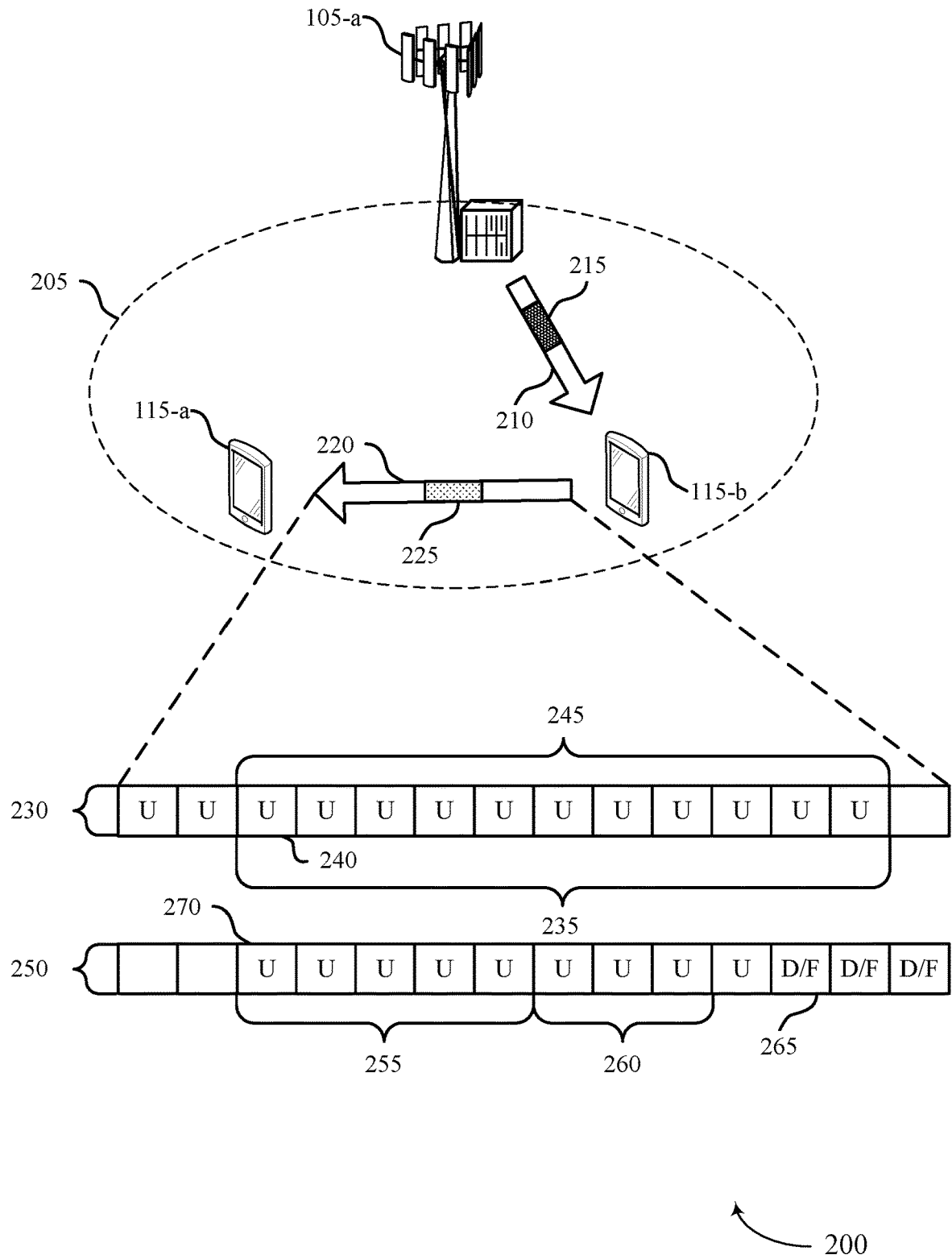
FIG. 2 illustrates an example of a wireless communications system that supports enhanced sidelink resource pools in accordance with aspects of the present disclosure.

FIG. 2 illustrates an example of a wireless communications system 200 that supports enhanced sidelink resource pools in accordance with aspects of the present disclosure. The wireless communications system 200 may implement or be implemented by one or more aspects of the wireless communications system 100. For example, the wireless communications system 200 may include a UE 115-a, a UE 115-b, and a base station 105-a, which may be examples of the UE 115 and the base station 105 as described with reference to FIG. 1. The UE 115-a, the UE 115-b, or both, may reside within a geographic coverage region 205 associated with the base station 105-a. It should be noted that, while examples are discussed below, any number of devices and device types may be used to accomplish techniques described in the present disclosure.

Wireless devices within the wireless communications system 200 may perform one or more signaling operations over one or more communication links. For example, the base station 105-a may communicate with the UE 115-b via a communication link 210. Additionally or alternatively, the UE 115-b may perform sidelink communications with the UE 115-a via a communication link 220. For example, the base station 105-a may transmit an indication of a grant to the UE 115-b via the communication link 210. In some examples, the grant may correspond to a resource pool, where the UE 115-b may utilize the resource pool to perform sidelink communications. For example, the base station 105-a may transmit an indication of a sidelink resource pool to the UE 115-b, where the UE 115-b may utilize resources within the sidelink resource pool to perform sidelink communications with the UE 115-a.

In some examples, the resource pool indicated by the base station 105-a may indicate, to the UE 115-b, slots, symbols, sidelink parameters, or any combination thereof, that the UE 115-b may utilize for sidelink communications over the communication link 220. For example, the resource pool may indicate slots, symbols, or both, that are available for sidelink control transmissions, data transmissions, or both. Based on the resource pool, the UE 115-b may determine sidelink resources for sidelink communications. For example, the UE 115-b may determine that the resource pool corresponds to a sidelink slot 230. The UE 115-b may further determine that one or more symbols within the slot (e.g., symbols 245) may be utilized for sidelink communications (e.g., PC5 communications in V2X systems, IoT). In some cases, the UE 115-b may determine which symbols are available for sidelink communications based on one or more sidelink parameters. For example, the UE 115-b may determine a starting symbol 240 (e.g., indicated by sl-StartSymbol, where the starting symbol 240 may be in symbols 0-7 of the sidelink slot 230), or a length of symbols 235 (e.g., indicated by sl-LengthSymbols, where the length of the symbols 235 may include symbols 7-14 of the sidelink slot 230), or both. Additionally, the UE 115-b may determine a threshold number of symbols in a slot for additional sidelink messages. In some cases, the determined sidelink slot 230 may be denoted by sidelink resource pool (SL-RP).

In some cases, however, the SL-RP may exclude one or more slots, symbols, or both, based on symbol type, one or more parameters, and the like. For example, upon determining the SL-RP, the UE 115-b may determine that one or more slots, symbols, or both, may be excluded from a sidelink slot 250. For example, excluded slots, symbols, or both, for sidelink communications may correspond to slots reserved for physical sidelink broadcast channel (PSBCH), sidelink synchronization signals (S-SS), or both. Additionally or alternatively, excluded slots, symbols, or both, may correspond to slots with any symbol from sl-StartSymbol to sl-StartSymbol+sl-StartSymbol−1 that are not semi-statically configured as an uplink symbol. For example, a downlink or flexible (D/F) slot 265 may be excluded from the SL-RP. Such slots may be denoted as a non-Sidelink-Set (non-SL-Set), which may be further differentiated by non-SL-Set-Slot and non-SL-Set-Symbol (non-SL-Set-Sym). That is, the non-Sidelink-Set (non-SL-Set) may be an enhanced sidelink resource pool used for additional sidelink transmissions (e.g., SCI-only transmissions), and the non-Sidelink-Set may be comprised of resources from a slot that may be excluded from a base sidelink resource pool (non-SL-Set-Slot) and symbols that may be excluded from the base sidelink resource pool (non-SL-Set-Sym).

Additionally or alternatively, the resource pool may exclude reserved slots based on a length of a bitmap vector, entries of a bitmap vector, or both. For example, the SL-RP may include physical sidelink feedback channel (PSFCH) 260 occupying three symbols (e.g., one gap symbol and two PSFCH symbols). In such cases, the PSFCH 260 may occupy slots such that physical sidelink shared channel (PSSCH) transmissions may not be possible (e.g., between the UE 115-b and the UE 115-a). For example, a demodulation reference signal (DMRS) for PSSCH may be defined for six symbols. In addition, a one-symbol gap between the PSSCH and the PSFCH 260 may be used, for example, to provide for radio tuning/switching. However, due to the location of PSFCH 260 within the sidelink slot 250, there may not be enough symbols to include PSSCH DMRS. For example, an sl-StartSymbol may correspond to a symbol 270 within the sidelink slot 250. However, due to the location of the symbol 270, there may be five available symbols (e.g., symbols 270) available for PSSCH due to the location of the PSFCH 260. But since DMRS for PSSCH is defined for six symbols, PSSCH may not be possible in the sidelink slot 250 (e.g., even in a slot dedicated to sidelink communications). In such cases, symbols 255 may be referred to as non-PSSCH-Set.

In some cases, however, the UE 115-*b* may utilize previously unavailable resources for sidelink signaling. For example, the UE 115-*b* may receive, from the base station 105-*a*, a first control message 215 via the communication link 210 indicating a configuration of a first set of sidelink parameters for transmitting one or more sidelink messages. Accordingly, the UE 115-*b* may identify a base sidelink resource pool for transmitting the one or more sidelink messages. In some cases, such as those described by the present disclosure, the UE 115-*b* may further identify an enhanced sidelink resource pools that is different from the base sidelink resource pool for transmitting one or more additional sidelink messages 225. For example, the UE 115-*b* may utilize resources (e.g., from non-SL-Set, non-PSSCH-Set, or both) for a special sidelink transmission (e.g., additional sidelink messages 225) to the UE 115-*a* (e.g., scheduling a future sidelink transmission, providing feedback associated with a previously received sidelink transmission, or both).

Figure 3:
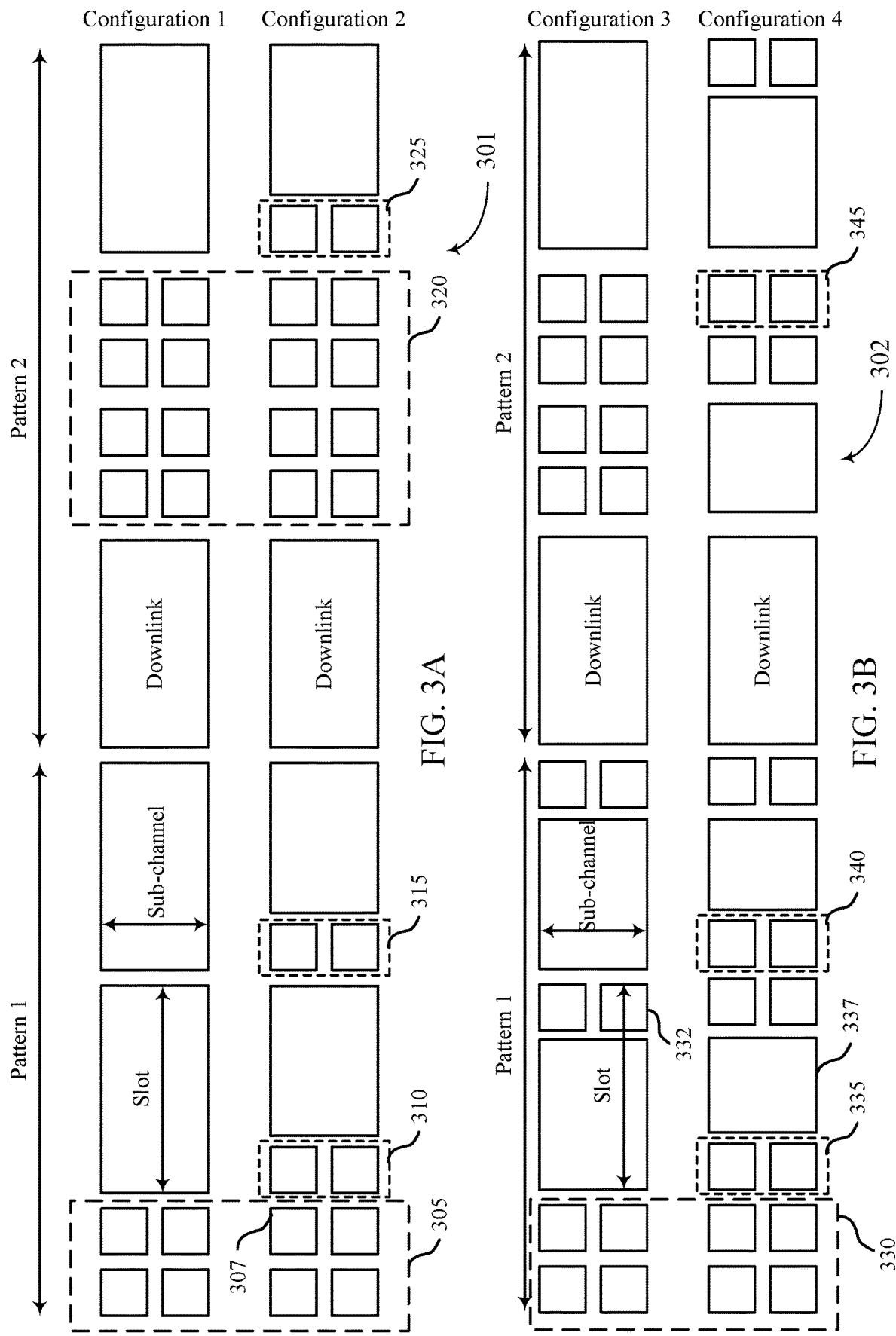
FIGS. 3A and 3B illustrate examples of resource configurations that supports enhanced sidelink resource pools in accordance with aspects of the present disclosure.

FIG. 3A illustrates an example of a resource configuration 301 that supports enhanced sidelink resource pools in accordance with aspects of the present disclosure. The resource configuration 301 may be implemented by one or more aspects of the wireless communications system 100. For example, the wireless communications system 200 may include a UE 115-*a*, a UE 115-*b*, and a base station 105-*a*, which may be examples of the UE 115 and the base station 105 as described with reference to FIG. 1.

As discussed with reference to FIG. 2, a UE may identify and utilize an enhanced sidelink resource pool for one or more special sidelink transmissions (e.g., control signaling). For example, the UE may identify the enhanced sidelink resource pool during an SL-RP determination procedure with a TDD configuration via sl-StartSym and sl-lengthSym. In some examples, resources corresponding to the enhanced sidelink resource pool (e.g., with resources corresponding to non-SL-Set) may correspond to a special SL-RP for transmissions of special sidelink traffic and signaling (e.g., SL-RP-Exceptional), such as a stand-alone SCI transmission. In some examples, the SL-RP-Exceptional may be further subdivided into time division multiplexing, frequency division multiplexing, or both, which may be collectively classified as SL-RP-Exceptional-Pool. That is, the UE may identify subsets of the SL-RP-Exceptional, where each subset may be associated with a respective index. In some examples, the SL-RP-Exceptional-Pool may be associated with one or multiple legacy SL-RP. For example, control commands transmitted over sidelink by the UE may include one or more SL-RP indices to identify a base sidelink resource pool corresponding to the SL-RP-Exceptional-Pool.

In some cases, one or more classes of UE may access the SL-RP-Exceptional resources. For example, an in-coverage UE, an anchor UE, or a programmable logic controller (PLC). In some cases, other UEs may be granted access to the SL-RP-Exceptional resource pool via a new SCI-2 format, a downlink control information from an anchor or base station, or both. Accordingly, the UE may reserve resources corresponding to the SL-RP-Exceptional resource pool to perform one or more special sidelink transmissions.

For example, the UE may reserve resources in SL-RP-Exceptional resource pool via an SCI-2 transmitted in SL-RP, via a reservation message in SL-RP-Exceptional, or both. Additionally or alternatively, the UE may access the resources in SL-RP-Exceptional via contention-based channel access procedures (e.g., listen-before-talk (LBT)). For example, based on the success of the channel access procedure, the UE may access and utilize the resources in SL-RP-Exceptional.

In some cases, upon reserving or accessing resources in the SL-RP-Exceptional resource pool, the UE may determine that an extra bitmap is imposed excluding one or more resources in the non-SL-Set for sidelink usage. In other cases, the UE may determine that extra parameters may configure a format of transmissions in the non-SL-Set. For example, sidelink transmissions and receptions in the non-SL-Set may follow one or more formats. In some cases, a sidelink format may be similar to a physical uplink control channel (PUCCH) format (e.g., PUCCH format 1), which may occupy one resource block (RB) in the frequency domain and 4-14 symbols in a slot, and the PUCCH may carry one or more bits (e.g., 1 or 2 bits). In other cases, a sidelink format may be similar to another PUCCH format (e.g., PUCCH format 2), which may occupy multiple RBs and symbols and may carry more than 2 bits. Additionally or alternatively, the UE may determine extra parameters that configured a starting symbol, a minimum number of uplink symbols in a slot, or both. Based on the determinations by the UE, the UE may utilize resources within the SL-RP-Exceptional (e.g., non-SL-Set, non-SL-Set-Sym) to perform special sidelink transmissions.

In other cases, resources corresponding to non-PSSCH-Set may be used by one or more UEs. In such cases, a UE (e.g., any UE) may identify non-PSSCH-Set resources using the SL-RP. The identified non-PSSCH-Set may correspond to a specific SL-RP, a group of SL-RP, or both. Additionally, the non-PSSCH-Set resources may be associated with a periodicity, such as a periodicity corresponding to a PSFCH periodicity (e.g., non-PSSCH-Set may repeat with PSFCH). After identifying the non-PSSCH-Set resources, a UE may reserve the resources via SCI-1 (e.g., legacy SCI-1) in SL-RP. However, PSSCH transmissions over such resources may be prohibited. In such cases, the resources may be utilized, by the UE, for transmitting special sidelink traffic. For example, the UE may utilize the non-PSSCH-Set resources for a stand-alone SCI transmission, an SCI repetition, enhancement of SCI coverage, reliability, or both, or any combination thereof. In some cases, the UE may leverage SCI-2 to further indicate a format or type of the special sidelink traffic. For example, the UE may indicate a PUCCH 1-like format, a PUCCH 2-like format, or both, for the special sidelink transmission.

Special sidelink transmissions may correspond to stand-alone SCI transmissions. For example, a PLC may communicate with multiple UEs performing stand-alone transmissions, where SCI transmissions from the PLC to the multiple stand-alone UEs may be referred to as SCI-downlink (SCI-D). In other examples, a stand-alone UE may transmit SCI to one PLC, which may be referred to as SCI-uplink (SCI-U). For example, special stand-alone sidelink transmissions may correspond to a channel state information (CSI) report, a scheduling request (SR), buffer status reporting (BSR), discovery, a link recovery request (LRR), HARQ, inter-UE coordination, group reservation, and the like. Such stand-alone sidelink transmissions may provide finer granularity of resource allocation in both time and frequency. For example, for frequency allocation, resources may be allocated on a RB level, a resource element group (REG) level, a resource element (RE) level, or some combination thereof. Additionally, time resources may be allocated on a mini-slot or symbol level.

To further elucidate aspects of the present disclosure, the resource configurations 301 depicts two configurations (e.g., configuration 1 and configuration 2), where the configurations may support utilizing the enhanced sidelink resource pool to perform special sidelink transmissions. The resource configurations 301 may include slots (e.g., for uplink and downlink), sub-channels, and patterns associated with resource pools allocated for sidelink usage by the UE. For example, the UE may utilize one or more slots, symbols, or both, to perform scheduling of a sidelink transmission, scheduling of a sidelink feedback transmission, or both. For example, in both configuration 1 and 2, one or more symbols 307 may reside in a non-SL-Set-Slot 305. In the non-SL-Set-Slot 305, while no uplink symbols in the slot may be used for sidelink communications, the UE may utilize the non-SL-Set-Slot 305 to transmit a stand-alone SCI. For example, in configuration 1, the UE may perform a stand-alone SCI transmission during the non-SL-Set-Slot 305 to schedule a future sidelink transmission. Additionally or alternatively, the UE may perform a second stand-alone SCI transmission using configuration 1 during the second non-SL-Set-Slot 320 (e.g., to schedule a future sidelink transmission, to transmit CSI, SR, or the like).

Alternatively, the UE may utilize configuration 2 for sidelink transmissions. While the UE may utilize the non-SL-Set-Slot 305 and the second non-SL-Set-Slot 320 for stand-alone SCI transmissions in configuration 2, the UE may also leverage one or more non-SL-Set-Syms (e.g., where some uplink symbols in a slot may not be used for SL transmissions) to perform one or more stand-alone transmissions. For example, the UE may utilize a non-SL-Set-Sym 310 (e.g., or non-PSSCH-Set) to perform a stand-alone SCI transmission to schedule a future sidelink transmission. That is, the UE may utilize the non-SL-Set-Sym 310 to perform a stand-alone SCI transmission, where the non-SL-Set-Sym 310 may provide the UE with a finer granularity for scheduling such stand-alone SCI transmissions. Similarly, the UE may utilize a non-SL-Set-Sym 315 and 325 to perform stand-alone SCI transmissions at other symbol locations within configuration 2.

FIG. 3B illustrates a resource configuration 302 which exemplifies the usage of non-SL-Set-Sym or non-PSSCH-Set, in conjunction with non-SL-Set-Slots, to provide feedback corresponding to received sidelink signaling or to both schedule a sidelink transmission and provide feedback associated with the sidelink transmission, using special sidelink signaling (e.g., using the enhanced sidelink resource pool). For example, in configuration 3, the UE may utilize a non-SL-Set-Slot 330 to perform stand-alone sidelink transmissions (e.g., to schedule one or more sidelink transmissions to a second UE). In some cases, however, there may exist one or more symbols 332 that may provide an opportunity for the UE to transmit feedback associated with the one or more sidelink transmissions to the second UE.

For example, after receiving a control message indicating a sidelink resource configuration (e.g., configuration 4), the UE may transmit a second control message requesting access to a symbol 335 (e.g., to access the enhanced sidelink resource pool). Based on the second control message, the UE may receive a third control message granting access to the enhanced sidelink resource pool. In other cases, the UE may transmit a fourth control signal reserving the enhanced sidelink resource pool for subsequent utilization. In some examples, the fourth control message may be transmitted on one or more resources associated with the base sidelink resource pool, one or more resources of the enhanced sidelink resource pool, or a combination thereof. In any case, the UE may utilize the symbol 335 (e.g., corresponding to a non-SL-Set-Sym, a non-PSSCH-Set, or both in the enhanced sidelink resource pool) to transmit a standalone sidelink transmission, which may schedule a sidelink communication in a communication slot 337 (e.g., scheduling to receive a sidelink transmission from the second UE).

In some examples, such as that illustrated in FIG. 3B, the UE may schedule further symbols corresponding to the enhanced sidelink resource pool. For example, the UE may schedule a symbol 340 to provide feedback corresponding to the communication slot 337. For example, the UE may perform a stand-alone sidelink transmission, such as a HARQ transmission, to the second UE corresponding to the transmission over the communication slot 337. Further, the UE may request, schedule, or reserve a symbol 345 for a stand-alone sidelink transmission to the second UE, another UE, or another wireless device (e.g., in a cellular-V2X (C-V2X) system, IoT).

Figure 4:
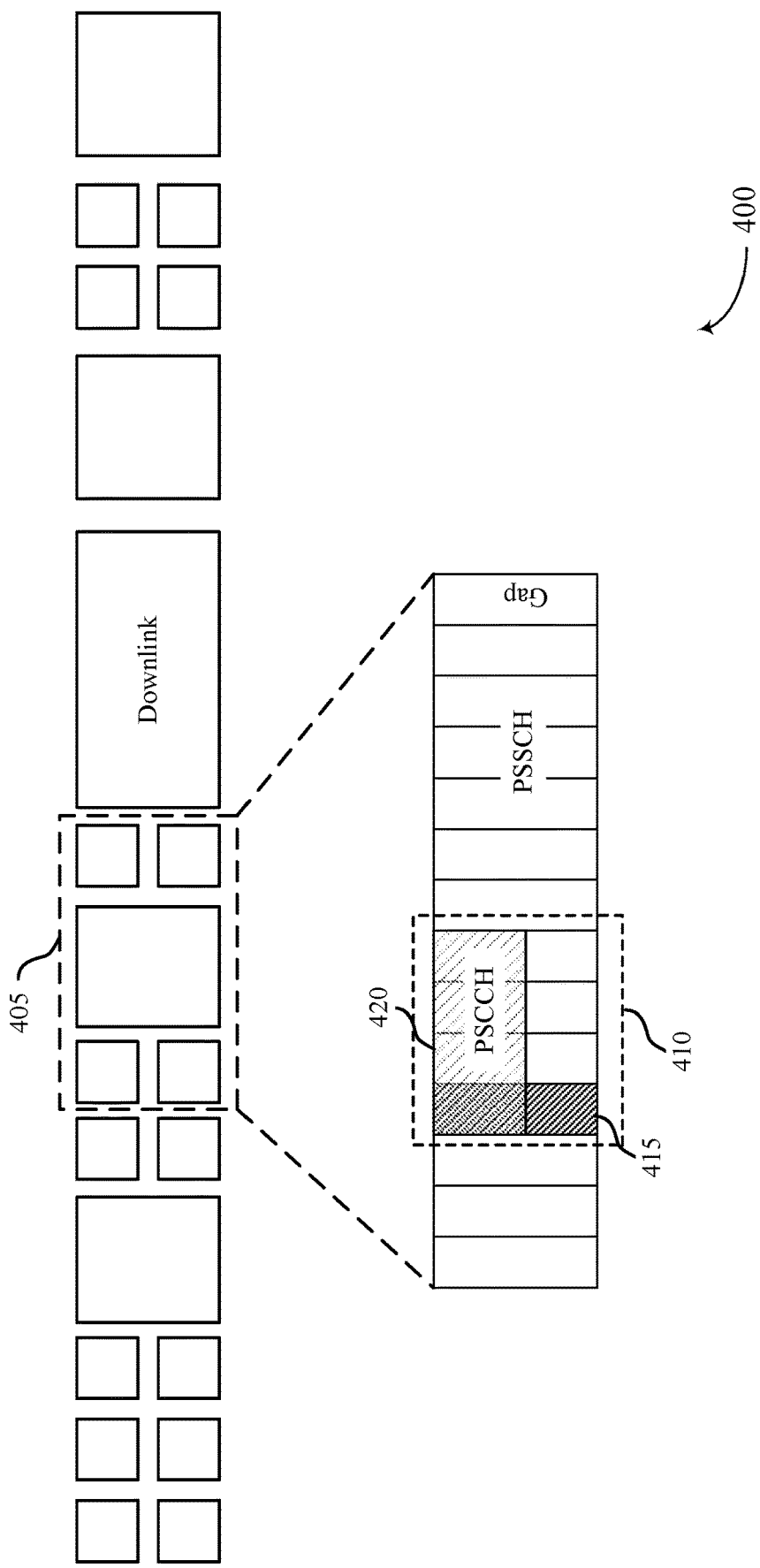
FIG. 4 illustrates an example of a resource configuration that supports enhanced sidelink resource pools in accordance with aspects of the present disclosure.

FIG. 4 illustrates an example of a resource configuration 400 that supports enhanced sidelink resource pools in accordance with aspects of the present disclosure. The resource configuration 400 may be implemented by one or more aspects of the wireless communications system 100. For example, the wireless communications system 200 may include a UE 115-a, a UE 115-b, and a base station 105-a, which may be examples of the UE 115 and the base station 105 as described with reference to FIG. 1.

The resource configuration 400 illustrates a UE utilizing resources in non-SL-Set and non-PSSCH-Set for special sidelink transmissions. In some examples, while resources in non-SL-Set and non-PSSCH-Set may be used for control signaling, if no control signaling exists, the UE may utilize non-SL-Set and non-PSSCH-Set for data transmissions (e.g., such as PSCCH). Additionally, when performing data transmissions over non-SL-Set and non-PSSCH-Set, an associated frame structure corresponding to the resource configuration 400 may be modified.

For example, a frame structure 405 of the resource configuration 400 may include a non-SL-Set resource, a non-PSSCH-Set resource, or both. As such, the frame structure 405 may be modified to include an additional data transmission 410, where an SCI 415 for legacy UEs and a physical sidelink control channel (PSCCH) transmission 420 are nested within the additional data transmission 410 (e.g., within a non-SL-Set, a non-PSSCH-Set, or both).

By modifying the frame structure 405 to include both the SCI 415 and the PSCCH transmission 420, resources that may have been previously unused may be leveraged by the UE to perform one or more additional data transmissions over sidelink to one or more other UEs. By reducing the amount of unused resources, overall network efficiency may be improved, along with improved coordination between devices (e.g., in C-V2X, V2X, IoT).

Figure 5:
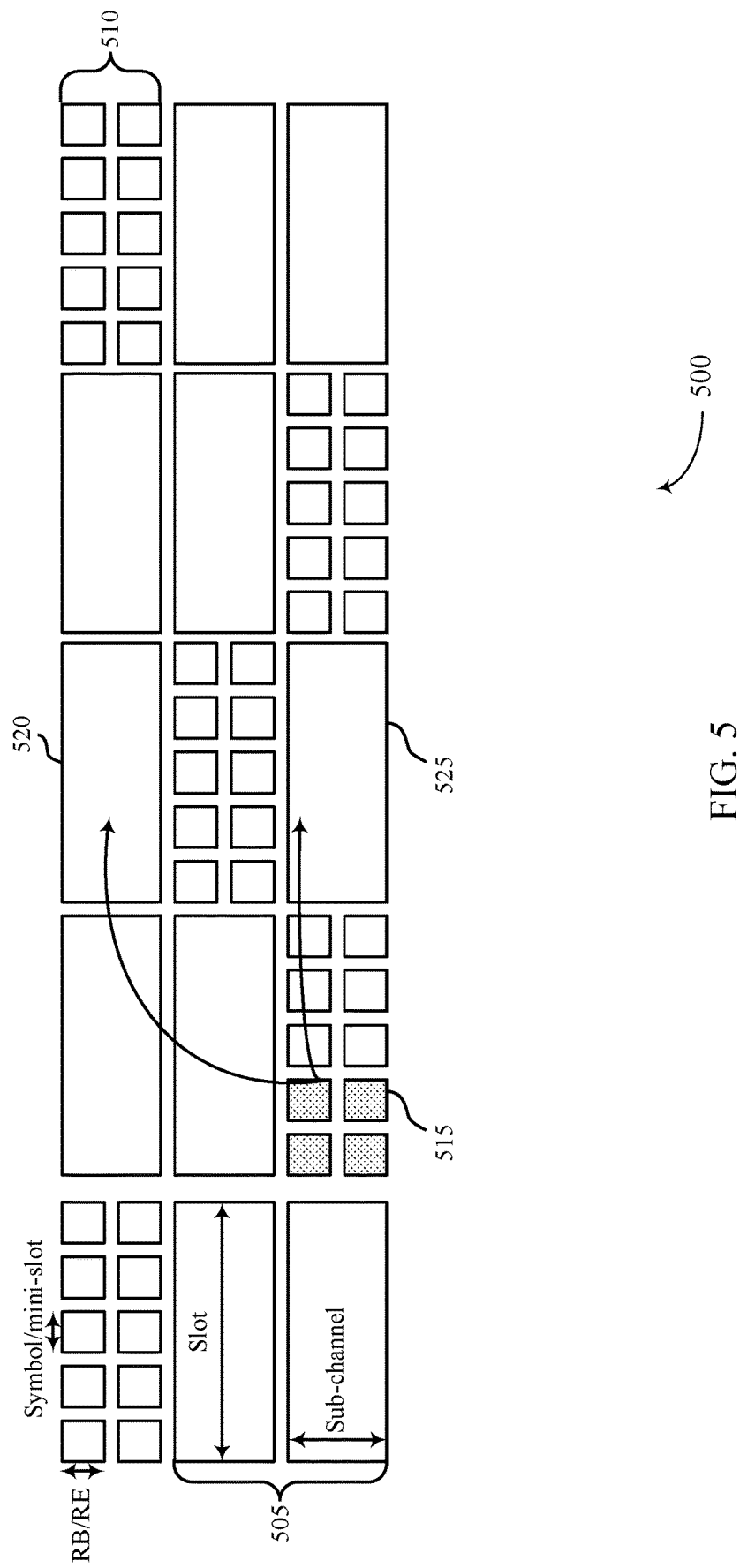
FIG. 5 illustrates an example of a resource configuration that supports enhanced sidelink resource pools in accordance with aspects of the present disclosure.

FIG. 5 illustrates an example of a resource configuration 500 that supports enhanced sidelink resource pools in accordance with aspects of the present disclosure. The resource configuration 500 may be implemented by one or more aspects of the wireless communications system 100. For example, the wireless communications system 200 may include a UE 115-a, a UE 115-b, and a base station 105-a, which may be examples of the UE 115 and the base station 105 as described with reference to FIG. 1.

Aspects of the present disclosure further provide for some resources within SL-RP to be designated (e.g., reconfigured) for transmitting sidelink control messages. Such reconfigured SL-RP resources may be denoted SL-RP-Control. To realize such a reconfiguration, a UE may receive a resource pool bitmap excluding resources from SL-RP that are reserved for sidelink control signaling (e.g., the resources corresponding to SL-RP-Control). The exclusion of resources may realize a dedicated resource configuration for SL-RP-Control. In some cases, the dedicated resources may be combined with resources from non-SL-Set, may originate from non-SL-Set, or both.

The UE may reserve the dedicated resources from the base sidelink resource pool to perform one or more sidelink control signaling during the indicated dedicated resources. For example, the UE may reserve the dedicated resources via a new SCI-2 (e.g., a fifth control message) transmitted in the SL-RP, in SCI-D or SCI-U transmitted in SL-RP-Control, or both. In some cases, however, resources may not be reserved via SCI-1 (e.g., legacy).

Additionally, the UE may receive a second bitmap indicating resources reserved for SL-RP-Control. The second bitmap may indicate the resources as a sub-pool of one or more SL-RP (e.g., identified by an index). In some examples, the resources may be combined with resources from non-PSSCH-Set, be generated from non-PSSCH-Set, or both, further expanding available resources for stand-alone sidelink transmissions.

In some cases, such a direct indication of the resources may provide compatibility with legacy devices. For example, with the second bitmap indicating the reserved resources, SL-RP-Control resources may be reserved via SCI-1 (e.g., a sixth control message). Alternatively, the UE may perform opportunistic (e.g., contention based) access to the SL-RP-Control resources if no legacy UE reserved the resources. Other UEs may additionally reserve SL-RP-Control resources, which may be further sub-divided by the other UEs via S-uplink control information (S-UCI), S-downlink control information (S-DCI), or a combination thereof.

For example, the resource configuration 500 may include an allocation 510 including resources for SCI-U or SCI-D, along with resources associated with the base sidelink resource pool. Additionally, the resource configuration 500 may also include a second allocation 505 that supports SCI and PSSCH transmissions. When the UE receives the bitmap and the second bitmap indicating SL-RP-Control resources, the UE may determine time and frequency resources corresponding to the SL-RP-Control resources as well as an associated periodicity. In some examples, further parameters may be provided to the UE indicating granularity and formats of S-UCI and S-DCI.

For example, the UE may receive the bitmap and second bitmap indicating an SL-RP-Control that may be associated with a single SL-RP. For example, the UE may determine from control symbols 515 that there is a single index indicating a SL-RP that the UE may utilize for subsequent transmissions (e.g., stand-alone transmissions). That is, the control symbols 515 may include a one-to-one mapping within the control commands (e.g., grant/scheduling) that is associated with one SL-RP. Based on the control symbols 515, the UE may utilize the same allocation (e.g., a slot 525) to perform sidelink communications over. Alternatively, the control symbols 515 may indicate a cross allocation SL-RP, where the UE may utilize a slot 520 in a different allocation to perform subsequent sidelink communications.

Alternatively, SL-RP-Control may be associated with multiple SL-RPs (e.g., and therefore, multiple SL-RP indices). In such cases, the control symbols 515 (e.g., control commands) may include indices of SL-RP or a bitmap of associated SL-RP, where the control commands may schedule one or more UEs on one or more allocations. For example, the control commands may schedule a first UE to perform sidelink signaling in the slot 525, while the control commands may schedule a second UE to perform sidelink signaling in the slot 520.

Figure 6:
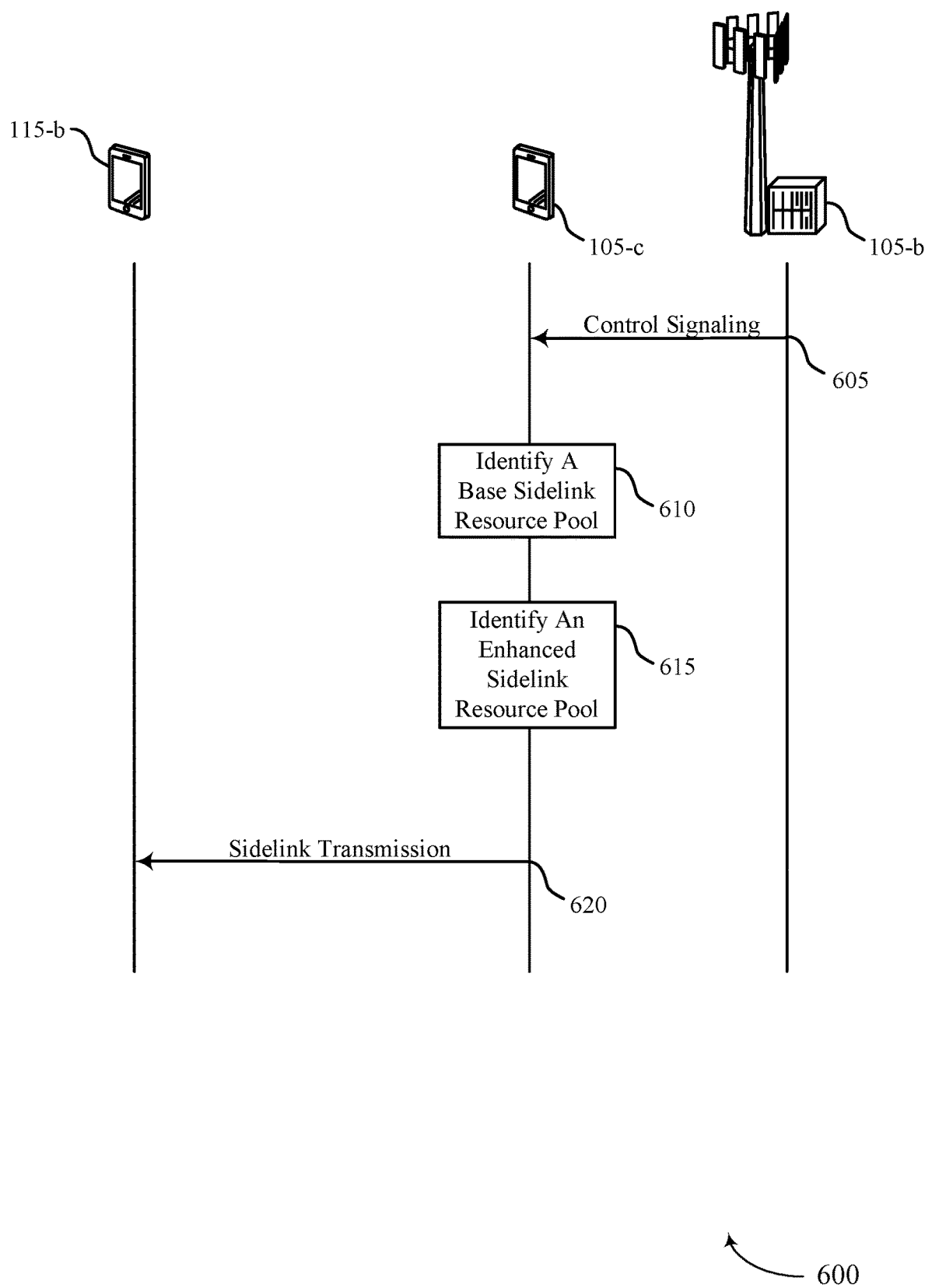
FIG. 6 illustrates an example of a process flow in a system that supports enhanced sidelink resource pools in accordance with aspects of the present disclosure.

FIG. 6 illustrates an example of a process flow 600 that supports enhanced sidelink resource pools in accordance with aspects of the present disclosure. The process flow 600 may be implemented by one or more aspects of the wireless communications system 100 and the wireless communications system 200. For example, the process flow 600 may correspond to communications between a UE 115-b, a UE 115-c, and a base station 105-b, which may be examples of the UE 115 and the base station 105 as described with reference to FIG. 1. It should be noted that, while examples are discussed below, any number of devices and device types may be used to accomplish implementations described in the present disclosure. In the following description of the process flow 600, operations between the UE 115-b, the UE 115-c, and the base station 105-b may occur in a different order or at different times than as shown. Some operations may also be omitted from the process flow 600, and other operations may be added to the process flow 600.

At 605, the base station 105-b may transmit control signaling, to the UE 115-c, indicating a configuration of a first set of sidelink parameters for transmitting one or more sidelink messages. For example, as discussed previously with reference to FIG. 2, the UE 115-c may receive indications of sl-StartSymbol, sl-LengthSymbols, or both.

At 610, the UE 115-c may identify a base sidelink resource pool for transmitting one or more sidelink messages based on the control signaling received at 605. Based on the base sidelink resource pool, at 615, the UE 115-c may identify an enhanced sidelink resource pool that is different from the base sidelink resource pool. In some cases, the UE 115-c may identify the enhanced sidelink resource pool based on one or more sidelink parameters, one or more additional control signaling, one or more bitmaps, and the like.

At 620, based on the identified enhanced sidelink resource pool, the UE 115-c may perform a sidelink transmission to the UE 115-b.

Figure 7:
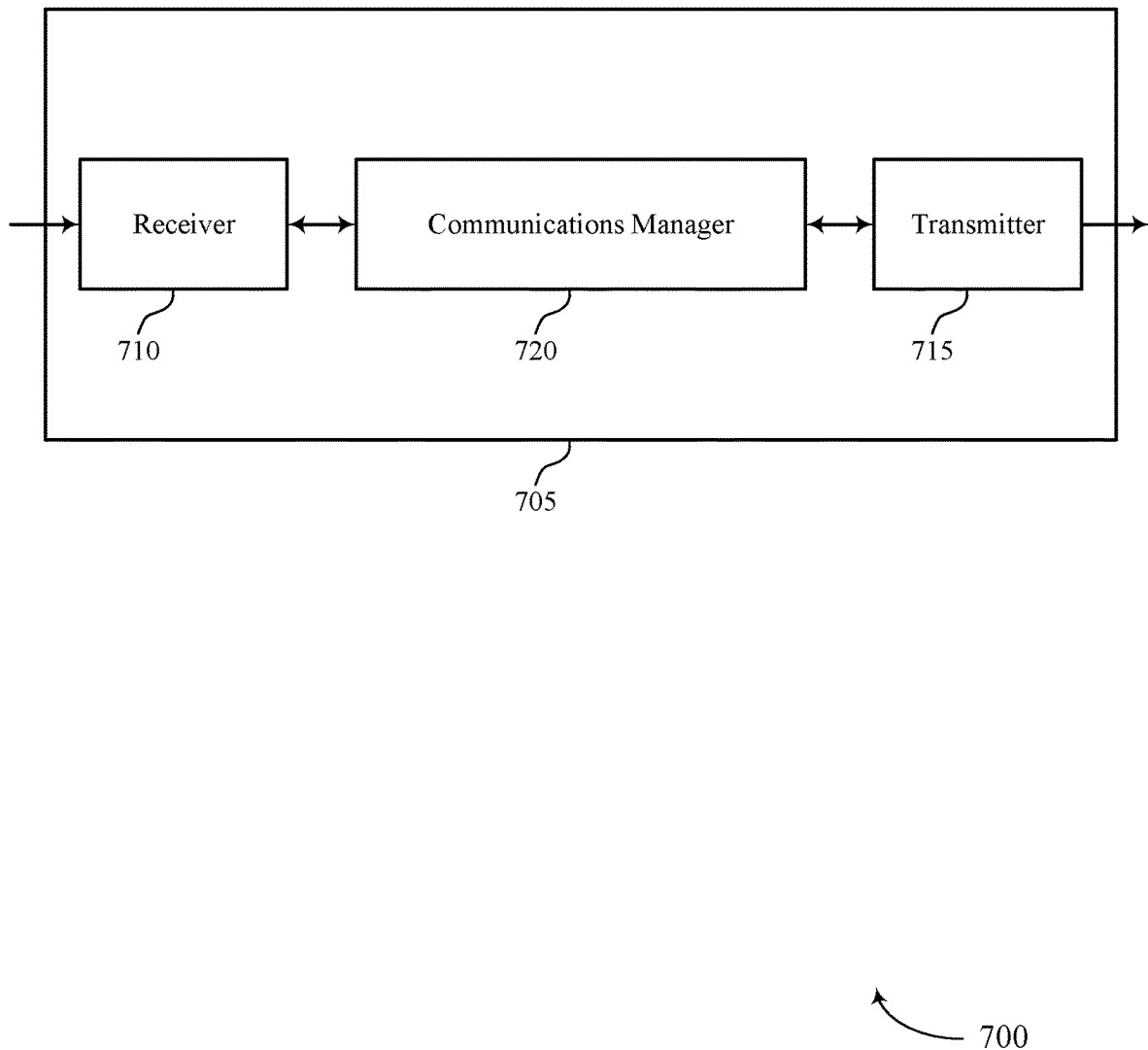
FIGS. 7 and 8 show block diagrams of devices that support enhanced sidelink resource pools in accordance with aspects of the present disclosure.

FIG. 7 shows a block diagram 700 of a device 705 that supports enhanced sidelink resource pools in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhanced sidelink resource pools). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhanced sidelink resource pools). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of enhanced sidelink resource pools as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving a first control message indicating a configuration of a first set of sidelink parameters for transmitting one or more sidelink messages. The communications manager 720 may be configured as or otherwise support a means for identifying a base sidelink resource pool for transmitting the one or more sidelink messages. The communications manager 720 may be configured as or otherwise support a means for identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The communications manager 720 may be configured as or otherwise support a means for transmitting the one or more additional sidelink messages on resources selected from the enhanced sidelink resource pool.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption and reduced computational resources by utilizing an enhanced sidelink resource pool to perform additional sidelink communications.

Figure 8:
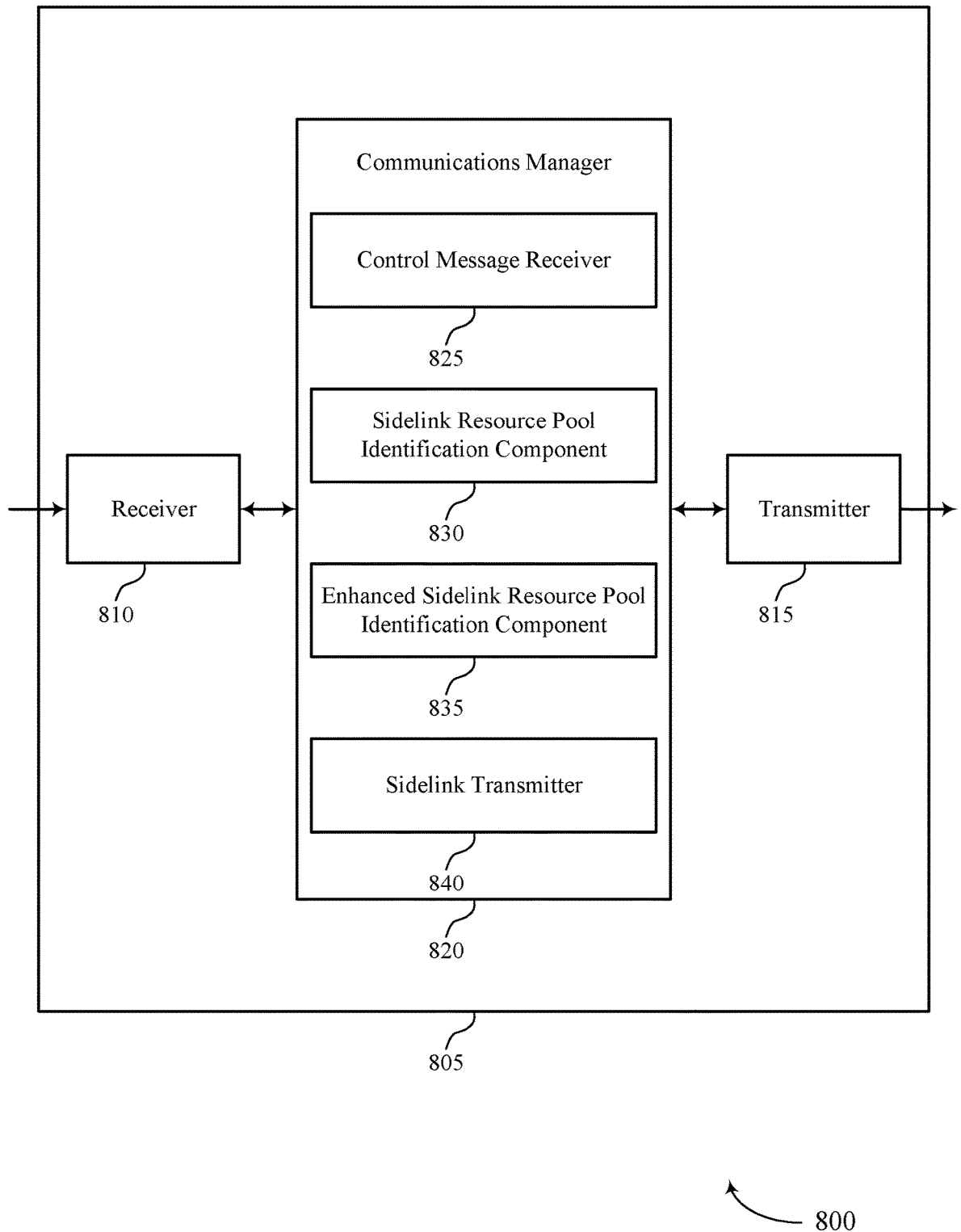

FIG. 8 shows a block diagram 800 of a device 805 that supports enhanced sidelink resource pools in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enhanced sidelink resource pools). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhanced sidelink resource pools). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of enhanced sidelink resource pools as described herein. For example, the communications manager 820 may include a control message receiver 825, a sidelink resource pool identification component 830, an enhanced sidelink resource pool identification component 835, a sidelink transmitter 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The control message receiver 825 may be configured as or otherwise support a means for receiving a first control message indicating a configuration of a first set of sidelink parameters for transmitting one or more sidelink messages. The sidelink resource pool identification component 830 may be configured as or otherwise support a means for identifying a base sidelink resource pool for transmitting the one or more sidelink messages. The enhanced sidelink resource pool identification component 835 may be configured as or otherwise support a means for identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The sidelink transmitter 840 may be configured as or otherwise support a means for transmitting the one or more additional sidelink messages on resources selected from the enhanced sidelink resource pool.

Figure 9:
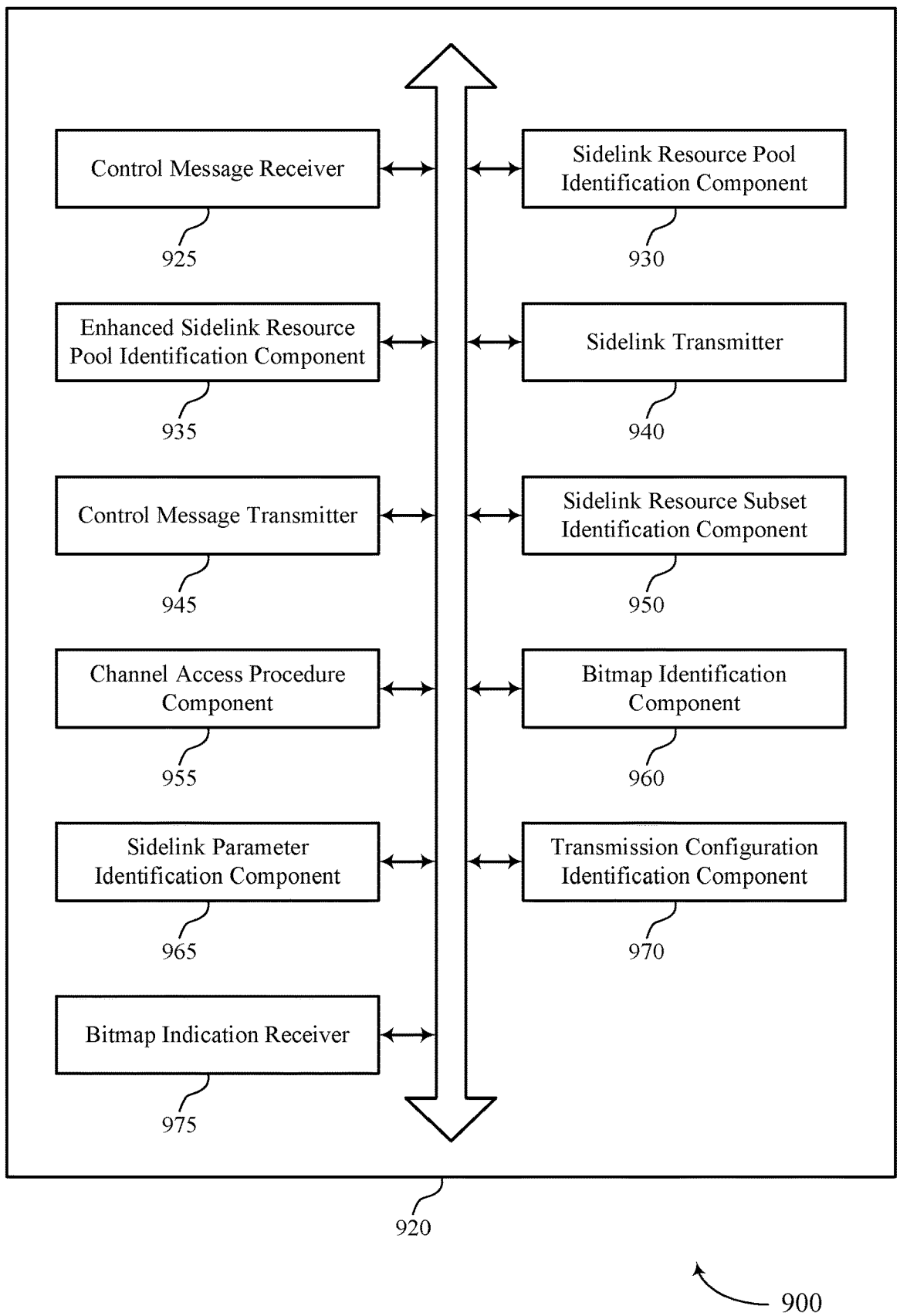
FIG. 9 shows a block diagram of a communications manager that supports enhanced sidelink resource pools in accordance with aspects of the present disclosure.

FIG. 9 shows a block diagram 900 of a communications manager 920 that supports enhanced sidelink resource pools in accordance with aspects of the present disclosure. The communications manager 920 may be an example of aspects of a communications manager 720, a communications manager 820, or both, as described herein. The communications manager 920, or various components thereof, may be an example of means for performing various aspects of enhanced sidelink resource pools as described herein. For example, the communications manager 920 may include a control message receiver 925, a sidelink resource pool identification component 930, an enhanced sidelink resource pool identification component 935, a sidelink transmitter 940, a control message transmitter 945, a sidelink resource subset identification component 950, a channel access procedure component 955, a bitmap identification component 960, a sidelink parameter identification component 965, a transmission configuration identification component 970, a bitmap indication receiver 975, or any combination thereof. Each of these components may communicate, directly or indirectly, with one another (e.g., via one or more buses).

The communications manager 920 may support wireless communications at a first UE in accordance with examples as disclosed herein. The control message receiver 925 may be configured as or otherwise support a means for receiving a first control message indicating a configuration of a first set of sidelink parameters for transmitting one or more sidelink messages. The sidelink resource pool identification component 930 may be configured as or otherwise support a means for identifying a base sidelink resource pool for transmitting the one or more sidelink messages. The enhanced sidelink resource pool identification component 935 may be configured as or otherwise support a means for identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The sidelink transmitter 940 may be configured as or otherwise support a means for transmitting the one or more additional sidelink messages on resources selected from the enhanced sidelink resource pool.

In some examples, to support transmitting the one or more additional sidelink messages, the control message receiver 925 may be configured as or otherwise support a means for transmitting a second control message on one or more resources selected from the enhanced sidelink resource pool, the second control message being associated with one or more resources in the base sidelink resource pool, where the second control message indicates an index of the base sidelink resource pool.

In some examples, the control message receiver 925 may be configured as or otherwise support a means for receiving a third control message granting access to the enhanced sidelink resource pool, where transmitting the one or more additional sidelink messages is based on the third control message granting access to the enhanced sidelink resource pool.

In some examples, the control message transmitter 945 may be configured as or otherwise support a means for transmitting a fourth control message that reserves the resources selected from the enhanced sidelink resource pool, where transmitting the one or more additional sidelink messages is based on reserving the resources selected from the enhanced sidelink resource pool.

In some examples, the fourth control message is transmitted on one or more resources of the base sidelink resource pool, or one or more resources of the enhanced sidelink resource pool, or any combination thereof.

In some examples, the sidelink resource subset identification component 950 may be configured as or otherwise support a means for identifying one or more subsets of sidelink resources within the enhanced sidelink resource pool, where each subset of sidelink resources of the one or more subsets of sidelink resources is associated with an index.

In some examples, the channel access procedure component 955 may be configured as or otherwise support a means for performing a channel access procedure prior to transmitting the one or more additional sidelink messages, where transmitting the one or more additional sidelink messages is based on the channel access procedure being successful.

In some examples, the bitmap identification component 960 may be configured as or otherwise support a means for identifying a bitmap that indicates one or more resources that are excluded from the enhanced sidelink resource pool, where the resources selected from the enhanced sidelink resource pool are based on the one or more excluded resources.

In some examples, the sidelink parameter identification component 965 may be configured as or otherwise support a means for identifying a second set of sidelink parameters associated with transmitting the one or more additional sidelink messages using the enhanced sidelink resource pool, where the second set of sidelink parameters configure a format of the one or more additional sidelink messages, a starting symbol of the one or more additional sidelink messages, or a threshold number of symbols in a slot for the one or more additional sidelink messages, or any combination thereof.

In some examples, the identifying the enhanced sidelink resource pool is based on a coverage status of the UE, or a type of the UE, or a capability of the UE, or any combination thereof.

In some examples, the transmission configuration identification component 970 may be configured as or otherwise support a means for identifying a transmission configuration from a set of one or more transmission configurations for transmitting the one or more additional sidelink messages on the resources selected from the enhanced sidelink resource pool, each transmission configuration of the set of one or more transmission configurations including one or more resource patterns for the resources selected from the enhanced sidelink resource pool, where transmitting the one or more additional sidelink messages is based on the identified transmission configuration.

In some examples, the control message receiver 925 may be configured as or otherwise support a means for receiving a fifth control message indicating a format of the one or more additional sidelink messages, or a type of the one or more additional sidelink messages, or any combination thereof, where transmitting the one or more additional sidelink messages is based on the format of the one or more additional sidelink messages, or the type of the one or more additional sidelink messages, or any combination thereof.

In some examples, the sidelink resource pool identification component 930 may be configured as or otherwise support a means for identifying a set of one or more sidelink resources from the base sidelink resource pool based on the first set of sidelink parameters, the set of one or more sidelink resources being unavailable for sidelink shared channel transmissions. In some examples, the sidelink transmitter 940 may be configured as or otherwise support a means for transmitting the one or more additional sidelink messages on resources selected from the set of one or more sidelink resources.

In some examples, the control message receiver 925 may be configured as or otherwise support a means for receiving, on resources associated with the base sidelink resource pool, a sixth control message reserving the set of one or more sidelink resources for the one or more additional sidelink messages, where the set of one or more sidelink resources are identified based on the sixth control message reserving the set of one or more sidelink resources.

In some examples, the set of one or more sidelink resources has a periodicity associated with a sidelink feedback channel.

In some examples, the sidelink resource pool identification component 930 may be configured as or otherwise support a means for identifying a set of resources configured for transmitting one or more sidelink control messages, where the set of resources is identified based on the base sidelink resource pool, or the enhanced sidelink resource pool, or any combination thereof. In some examples, the sidelink transmitter 940 may be configured as or otherwise support a means for transmitting the one or more sidelink control messages on the set of resources.

In some examples, the bitmap indication receiver 975 may be configured as or otherwise support a means for receiving an indication of a bitmap that indicates the set of resources associated with transmitting the one or more sidelink control messages, the set of resources being excluded from the base sidelink resource pool, where the set of resources are identified based on the bitmap.

In some examples, the bitmap indication receiver 975 may be configured as or otherwise support a means for receiving an indication of a bitmap that indicates the set of resources associated with transmitting the one or more sidelink control messages, the set of resources including a subset of resources from the base sidelink resource pool, where the set of resources are identified based on the bitmap.

In some examples, a sidelink control message of the one or more sidelink control messages includes a bitmap indicating time domain resources, frequency domain resources, a resource periodicity, or any combination thereof. In some examples, the sidelink control message provides control information associated with resources in the base sidelink resource pool, in a third sidelink resource pool, or any combination thereof, based on the bitmap.

In some examples, the one or more additional sidelink messages include a sidelink data transmission. In some examples, a frame structure includes the resources selected from the enhanced sidelink resource pool and one or more resources from the base sidelink resource pool.

In some examples, the enhanced sidelink resource pool includes a first set of one or more sidelink resources and a second set of one or more sidelink resources. In some examples, the first set of one or more sidelink resources includes one or more slots excluded from the base sidelink resource pool. In some examples, the second set of one or more sidelink resources includes one or more symbols of a slot that are excluded from the base sidelink resource pool.

In some examples, the one or more additional sidelink messages include sidelink control information, a repetition of sidelink control information, a channel state information report, a scheduling request, a buffer status report, a discovery message, a link recovery request, a feedback message, a UE-coordination message, a group reservation, or any combination thereof.

In some examples, the first set of sidelink parameters includes at least a first parameter and a second parameter. In some examples, the first parameter indicates a starting symbol used for transmitting the one or more sidelink messages in a slot and the second parameter indicates a number of symbols for transmitting the one or more sidelink messages in the slot.

Figure 10:
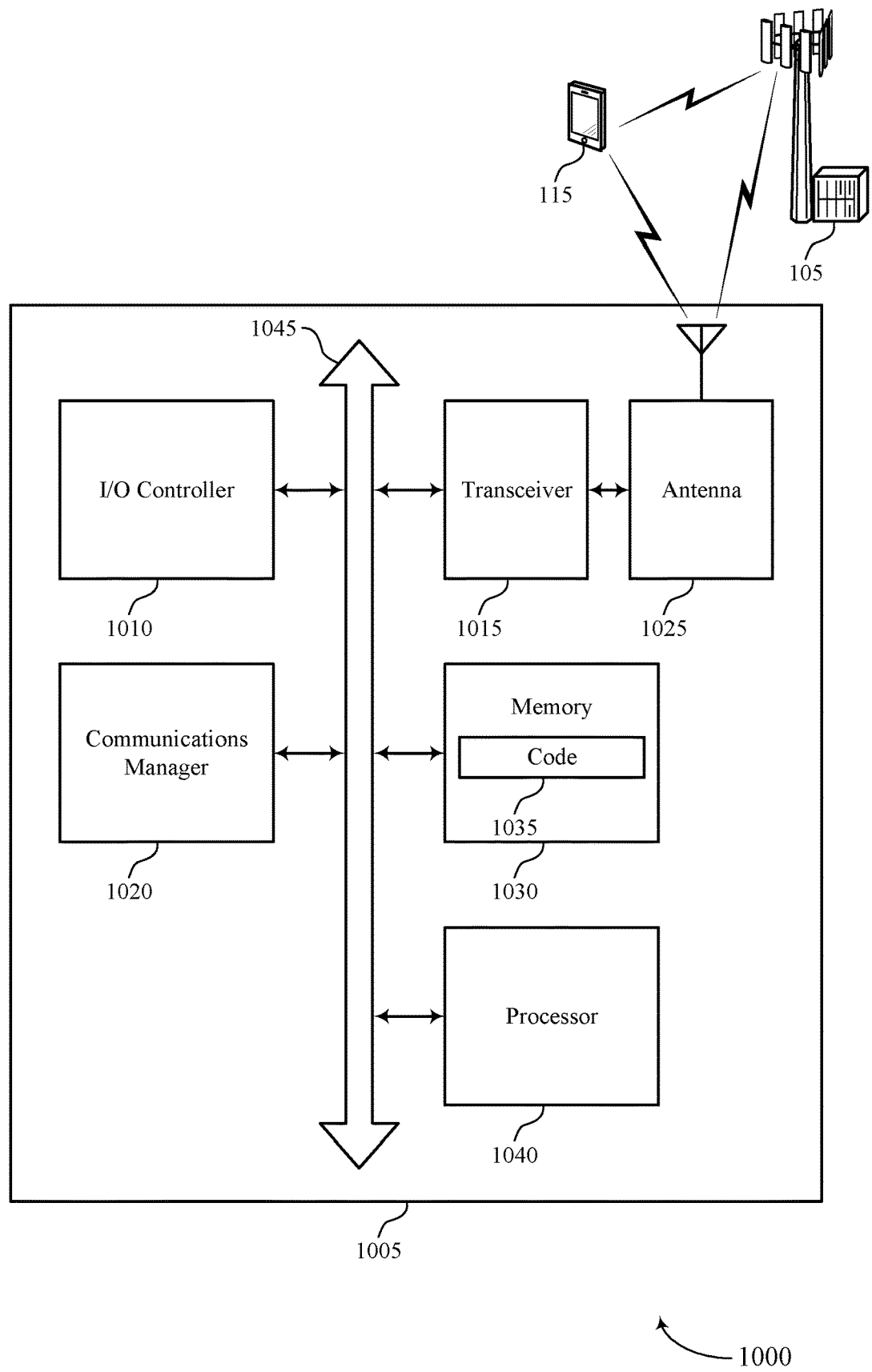
FIG. 10 shows a diagram of a system including a device that supports enhanced sidelink resource pools in accordance with aspects of the present disclosure.

FIG. 10 shows a diagram of a system 1000 including a device 1005 that supports enhanced sidelink resource pools in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced sidelink resource pools). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving a first control message indicating a configuration of a first set of sidelink parameters for transmitting one or more sidelink messages. The communications manager 1020 may be configured as or otherwise support a means for identifying a base sidelink resource pool for transmitting the one or more sidelink messages. The communications manager 1020 may be configured as or otherwise support a means for identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The communications manager 1020 may be configured as or otherwise support a means for transmitting the one or more additional sidelink messages on resources selected from the enhanced sidelink resource pool.

By including or configuring the communications manager 1020 in accordance with examples as described herein, the device 1005 may support techniques for reduced power consumption, more efficient utilization of communication resources, improved coordination between devices, and improved utilization of processing capability by utilizing enhanced sidelink resource pools to perform additional sidelink communications between wireless devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of enhanced sidelink resource pools as described herein, or the processor 1040 and the memory 1030 may be otherwise configured to perform or support such operations.

Figure 11:
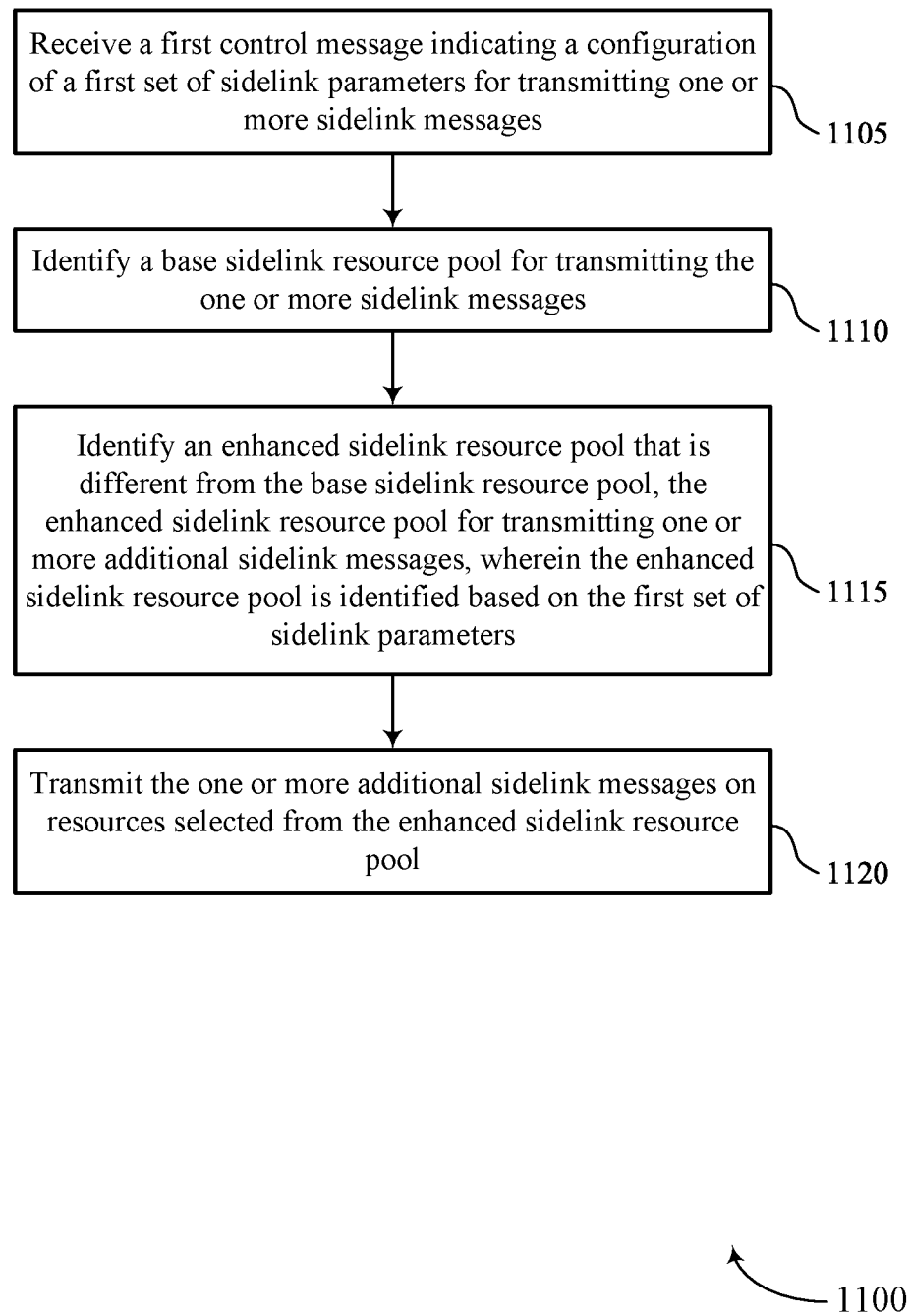
FIGS. 11 through 14 show flowcharts illustrating methods that support enhanced sidelink resource pools in accordance with aspects of the present disclosure.

FIG. 11 shows a flowchart illustrating a method 1100 that supports enhanced sidelink resource pools in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving a first control message indicating a configuration of a first set of sidelink parameters for transmitting one or more sidelink messages. The operations of 1105 may be performed in accordance with examples as disclosed herein. In some examples, aspects of the operations of 1105 may be performed by a control message receiver 925 as described with reference to FIG. 9.

At 1110, the method may include identifying a base sidelink resource pool for transmitting the one or more sidelink messages. The operations of 1110 may be performed in accordance with examples as disclosed herein. In some examples, aspects of the operations of 1110 may be performed by a sidelink resource pool identification component 930 as described with reference to FIG. 9.

At 1115, the method may include identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The operations of 1115 may be performed in accordance with examples as disclosed herein. In some examples, aspects of the operations of 1115 may be performed by an enhanced sidelink resource pool identification component 935 as described with reference to FIG. 9.

At 1120, the method may include transmitting the one or more additional sidelink messages on resources selected from the enhanced sidelink resource pool. The operations of 1120 may be performed in accordance with examples as disclosed herein. In some examples, aspects of the operations of 1120 may be performed by a sidelink transmitter 940 as described with reference to FIG. 9.

Figure 12:
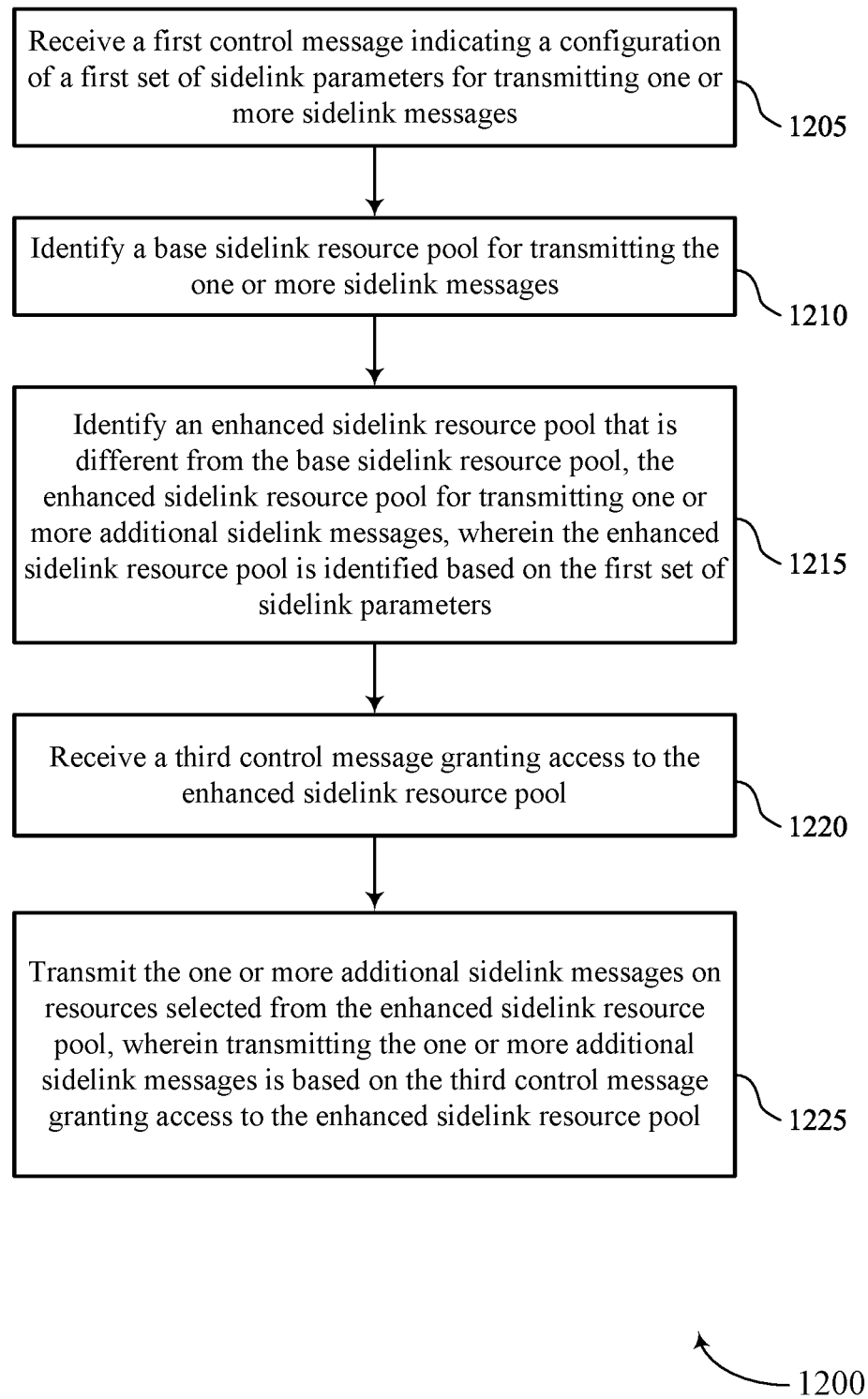

FIG. 12 shows a flowchart illustrating a method 1200 that supports enhanced sidelink resource pools in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving a first control message indicating a configuration of a first set of sidelink parameters for transmitting one or more sidelink messages. The operations of 1205 may be performed in accordance with examples as disclosed herein. In some examples, aspects of the operations of 1205 may be performed by a control message receiver 925 as described with reference to FIG. 9.

At 1210, the method may include identifying a base sidelink resource pool for transmitting the one or more sidelink messages. The operations of 1210 may be performed in accordance with examples as disclosed herein. In some examples, aspects of the operations of 1210 may be performed by a sidelink resource pool identification component 930 as described with reference to FIG. 9.

At 1215, the method may include identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The operations of 1215 may be performed in accordance with examples as disclosed herein. In some examples, aspects of the operations of 1215 may be performed by an enhanced sidelink resource pool identification component 935 as described with reference to FIG. 9.

At 1220, the method may include receiving a third control message granting access to the enhanced sidelink resource pool. The operations of 1220 may be performed in accordance with examples as disclosed herein. In some examples, aspects of the operations of 1220 may be performed by a control message receiver 925 as described with reference to FIG. 9.

At 1225, the method may include transmitting the one or more additional sidelink messages on resources selected from the enhanced sidelink resource pool, where transmitting the one or more additional sidelink messages is based on the third control message granting access to the enhanced sidelink resource pool. The operations of 1225 may be performed in accordance with examples as disclosed herein. In some examples, aspects of the operations of 1225 may be performed by a sidelink transmitter 940 as described with reference to FIG. 9.

Figure 13:
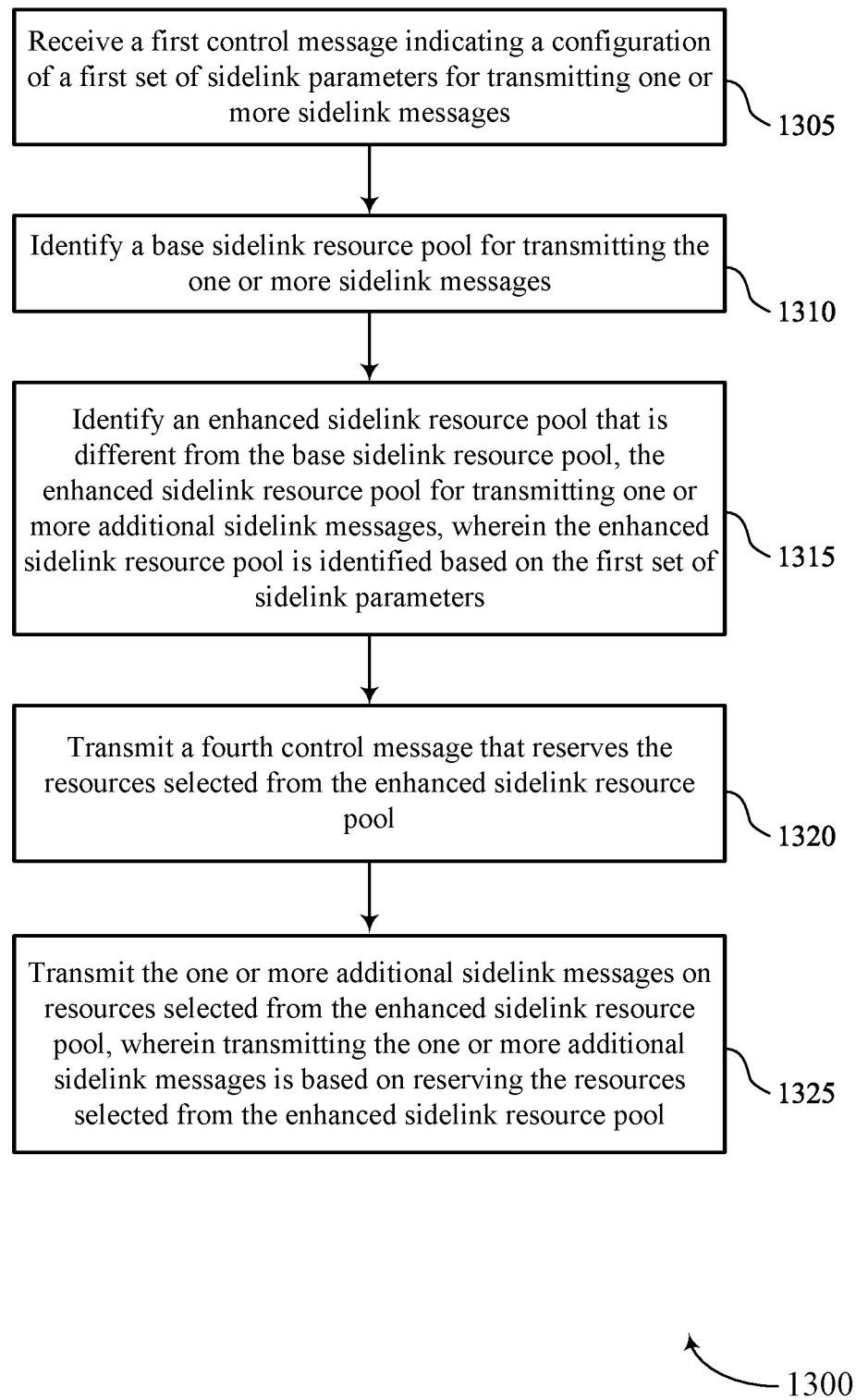

FIG. 13 shows a flowchart illustrating a method 1300 that supports enhanced sidelink resource pools in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving a first control message indicating a configuration of a first set of sidelink parameters for transmitting one or more sidelink messages. The operations of 1305 may be performed in accordance with examples as disclosed herein. In some examples, aspects of the operations of 1305 may be performed by a control message receiver 925 as described with reference to FIG. 9.

At 1310, the method may include identifying a base sidelink resource pool for transmitting the one or more sidelink messages. The operations of 1310 may be performed in accordance with examples as disclosed herein. In some examples, aspects of the operations of 1310 may be performed by a sidelink resource pool identification component 930 as described with reference to FIG. 9.

At 1315, the method may include identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The operations of 1315 may be performed in accordance with examples as disclosed herein. In some examples, aspects of the operations of 1315 may be performed by an enhanced sidelink resource pool identification component 935 as described with reference to FIG. 9.

At 1320, the method may include transmitting a fourth control message that reserves the resources selected from the enhanced sidelink resource pool. The operations of 1320 may be performed in accordance with examples as disclosed herein. In some examples, aspects of the operations of 1320 may be performed by a control message transmitter 945 as described with reference to FIG. 9.

At 1325, the method may include transmitting the one or more additional sidelink messages on resources selected from the enhanced sidelink resource pool, where transmitting the one or more additional sidelink messages is based on reserving the resources selected from the enhanced sidelink resource pool. The operations of 1325 may be performed in accordance with examples as disclosed herein. In some examples, aspects of the operations of 1325 may be performed by a sidelink transmitter 940 as described with reference to FIG. 9.

Figure 14:
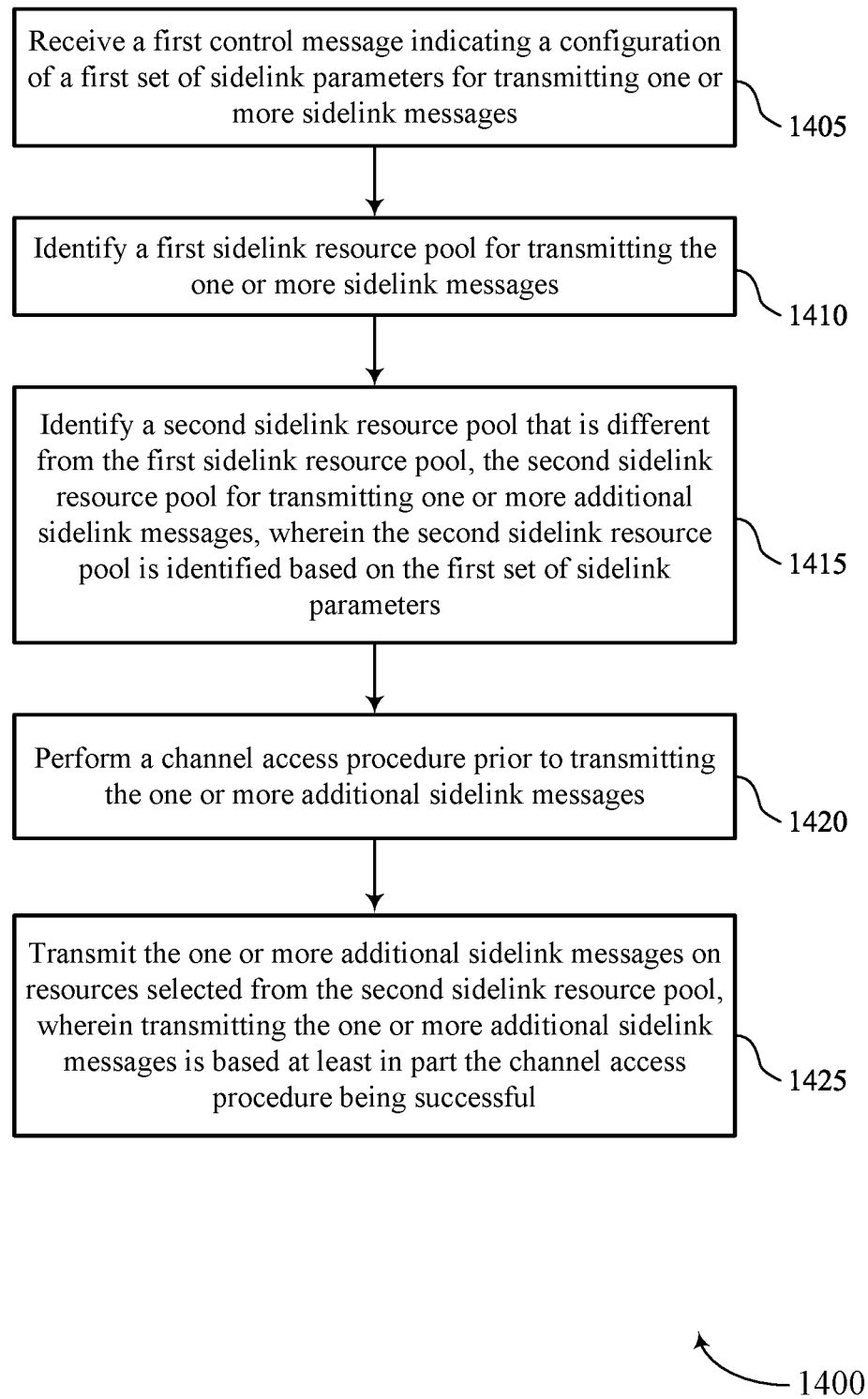

FIG. 14 shows a flowchart illustrating a method 1400 that supports enhanced sidelink resource pools in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving a first control message indicating a configuration of a first set of sidelink parameters for transmitting one or more sidelink messages. The operations of 1405 may be performed in accordance with examples as disclosed herein. In some examples, aspects of the operations of 1405 may be performed by a control message receiver 925 as described with reference to FIG. 9.

At 1410, the method may include identifying a base sidelink resource pool for transmitting the one or more sidelink messages. The operations of 1410 may be performed in accordance with examples as disclosed herein. In some examples, aspects of the operations of 1410 may be performed by a sidelink resource pool identification component 930 as described with reference to FIG. 9.

At 1415, the method may include identifying an enhanced sidelink resource pool that is different from the base sidelink resource pool, the enhanced sidelink resource pool for transmitting one or more additional sidelink messages, where the enhanced sidelink resource pool is identified based on the first set of sidelink parameters. The operations of 1415 may be performed in accordance with examples as disclosed herein. In some examples, aspects of the operations of 1415 may be performed by an enhanced sidelink resource pool identification component 935 as described with reference to FIG. 9.

At 1420, the method may include performing a channel access procedure prior to transmitting the one or more additional sidelink messages. The operations of 1420 may be performed in accordance with examples as disclosed herein. In some examples, aspects of the operations of 1420 may be performed by a channel access procedure component 955 as described with reference to FIG. 9.

At 1425, the method may include transmitting the one or more additional sidelink messages on resources selected from the enhanced sidelink resource pool, where transmitting the one or more additional sidelink messages is based on the channel access procedure being successful. The operations of 1425 may be performed in accordance with examples as disclosed herein. In some examples, aspects of the operations of 1425 may be performed by a sidelink transmitter 940 as described with reference to FIG. 9.

The following provides an overview of aspects of the present disclosure:

Aspect 1: A method for wireless communications at a first UE, comprising: receiving a first control message indicating a configuration of a first set of sidelink parameters for transmitting one or more sidelink messages; identifying a base sidelink resource pool for transmitting the one or more sidelink messages; identifying an enhanced sidelink resource pool that is different from the base sidelink resource pool, the enhanced sidelink resource pool for transmitting one or more additional sidelink messages, wherein the enhanced sidelink resource pool is identified based at least in part on the first set of sidelink parameters; and transmitting the one or more additional sidelink messages on resources selected from the enhanced sidelink resource pool.

Aspect 2: The method of aspect 1, wherein transmitting the one or more additional sidelink messages comprises: transmitting a second control message on one or more resources selected from the enhanced sidelink resource pool, the second control message being associated with one or more resources in the base sidelink resource pool, wherein the second control message indicates an index of the base sidelink resource pool.

Aspect 3: The method of any of aspects 1 through 2, further comprising: receiving a third control message granting access to the enhanced sidelink resource pool, wherein transmitting the one or more additional sidelink messages is based at least in part on the third control message granting access to the enhanced sidelink resource pool.

Aspect 4: The method of any of aspects 1 through 3, further comprising: transmitting a fourth control message that reserves the resources selected from the enhanced sidelink resource pool, wherein transmitting the one or more additional sidelink messages is based at least in part on reserving the resources selected from the enhanced sidelink resource pool.

Aspect 5: The method of aspect 4, wherein the fourth control message is transmitted on one or more resources of the base sidelink resource pool, or one or more resources of the enhanced sidelink resource pool, or any combination thereof.

Aspect 6: The method of any of aspects 1 through 5, further comprising: identifying one or more subsets of sidelink resources within the enhanced sidelink resource pool, wherein each subset of sidelink resources of the one or more subsets of sidelink resources is associated with an index.

Aspect 7: The method of any of aspects 1 through 6, further comprising: performing a channel access procedure prior to transmitting the one or more additional sidelink messages, wherein transmitting the one or more additional sidelink messages is based at least in part on the channel access procedure being successful.

Aspect 8: The method of any of aspects 1 through 7, further comprising: identifying a bitmap that indicates one or more resources that are excluded from the enhanced sidelink resource pool, wherein the resources selected from the enhanced sidelink resource pool are based at least in part on the one or more excluded resources.

Aspect 9: The method of any of aspects 1 through 8, further comprising: identifying a second set of sidelink parameters associated with transmitting the one or more additional sidelink messages using the enhanced sidelink resource pool, wherein the second set of sidelink parameters configure a format of the one or more additional sidelink messages, a starting symbol of the one or more additional sidelink messages, or a threshold number of symbols in a slot for the one or more additional sidelink messages, or any combination thereof.

Aspect 10: The method of any of aspects 1 through 9, wherein the identifying the enhanced sidelink resource pool is based at least in part on a coverage status of the UE, or a type of the UE, or a capability of the UE, or any combination thereof.

Aspect 11: The method of any of aspects 1 through 10, further comprising: identifying a transmission configuration from a set of one or more transmission configurations for transmitting the one or more additional sidelink messages on the resources selected from the enhanced sidelink resource pool, each transmission configuration of the set of one or more transmission configurations comprising one or more resource patterns for the resources selected from the enhanced sidelink resource pool, wherein transmitting the one or more additional sidelink messages is based at least in part on the identified transmission configuration.

Aspect 12: The method of any of aspects 1 through 11, further comprising: receiving a fifth control message indicating a format of the one or more additional sidelink messages, or a type of the one or more additional sidelink messages, or any combination thereof, wherein transmitting the one or more additional sidelink messages is based at least in part on the format of the one or more additional sidelink messages, or the type of the one or more additional sidelink messages, or any combination thereof.

Aspect 13: The method of any of aspects 1 through 12, further comprising: identifying a set of one or more sidelink resources from the base sidelink resource pool based at least in part on the first set of sidelink parameters, the set of one or more sidelink resources being unavailable for sidelink shared channel transmissions; and transmitting the one or more additional sidelink messages on resources selected from the set of one or more sidelink resources.

Aspect 14: The method of aspect 13, further comprising: receiving, on resources associated with the base sidelink resource pool, a sixth control message reserving the set of one or more sidelink resources for the one or more additional sidelink messages, wherein the set of one or more sidelink resources are identified based at least in part on the sixth control message reserving the set of one or more sidelink resources.

Aspect 15: The method of any of aspects 13 through 14, wherein the set of one or more sidelink resources has a periodicity associated with a sidelink feedback channel.

Aspect 16: The method of any of aspects 1 through 15, further comprising: identifying a set of resources configured for transmitting one or more sidelink control messages, wherein the set of resources is identified based at least in part on the base sidelink resource pool, or the enhanced sidelink resource pool, or any combination thereof; and transmitting the one or more sidelink control messages on the set of resources.

Aspect 17: The method of aspect 16, further comprising: receiving an indication of a bitmap that indicates the set of resources associated with transmitting the one or more sidelink control messages, the set of resources being excluded from the base sidelink resource pool, wherein the set of resources are identified based at least in part on the bitmap.

Aspect 18: The method of any of aspects 16 through 17, further comprising: receiving an indication of a bitmap that indicates the set of resources associated with transmitting the one or more sidelink control messages, the set of resources comprising a subset of resources from the base sidelink resource pool, wherein the set of resources are identified based at least in part on the bitmap.

Aspect 19: The method of any of aspects 16 through 18, wherein a sidelink control message of the one or more sidelink control messages comprises a bitmap indicating time domain resources, frequency domain resources, a resource periodicity, or any combination thereof, the sidelink control message provides control information associated with resources in the base sidelink resource pool, in a third sidelink resource pool, or any combination thereof, based at least in part on the bitmap.

Aspect 20: The method of any of aspects 1 through 19, wherein the one or more additional sidelink messages comprise a sidelink data transmission, a frame structure comprises the resources selected from the enhanced sidelink resource pool and one or more resources from the base sidelink resource pool.

Aspect 21: The method of any of aspects 1 through 20, wherein the enhanced sidelink resource pool comprises a first set of one or more sidelink resources and a second set of one or more sidelink resources, the first set of one or more sidelink resources comprises one or more slots excluded from the base sidelink resource pool, and the second set of one or more sidelink resources comprises one or more symbols of a slot that are excluded from the base sidelink resource pool.

Aspect 22: The method of any of aspects 1 through 21, wherein the one or more additional sidelink messages comprise sidelink control information, a repetition of sidelink control information, a channel state information report, a scheduling request, a buffer status report, a discovery message, a link recovery request, a feedback message, a UE-coordination message, a group reservation, or any combination thereof.

Aspect 23: The method of any of aspects 1 through 22, wherein the first set of sidelink parameters comprises at least a first parameter and a second parameter, the first parameter indicates a starting symbol used for transmitting the one or more sidelink messages in a slot and the second parameter indicates a number of symbols for transmitting the one or more sidelink messages in the slot.

Aspect 24: An apparatus for wireless communications at a first UE, comprising a processor; memory coupled with the processor; and instructions stored in the memory and executable by the processor to cause the apparatus to perform a method of any of aspects 1 through 23.

Aspect 25: An apparatus for wireless communications at a first UE, comprising at least one means for performing a method of any of aspects 1 through 23.

Aspect 26: A non-transitory computer-readable medium storing code for wireless communications at a first UE, the code comprising instructions executable by a processor to perform a method of any of aspects 1 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving a first control message indicating a configuration of a first set of sidelink parameters for transmitting one or more sidelink messages;
   identifying a base sidelink resource pool for transmitting the one or more sidelink messages;
   identifying an enhanced sidelink resource pool that is different from the base sidelink resource pool, the enhanced sidelink resource pool for transmitting one or more additional sidelink messages, wherein the enhanced sidelink resource pool is identified based at least in part on the first set of sidelink parameters, and wherein the enhanced sidelink resource pool comprises a set of one or more sidelink resources that are excluded from the base sidelink resource pool; and
   transmitting the one or more additional sidelink messages on resources selected from the enhanced sidelink resource pool.

2. The method of claim 1, wherein transmitting the one or more additional sidelink messages comprises:
   transmitting a second control message on one or more resources selected from the enhanced sidelink resource pool, the second control message being associated with one or more resources in the base sidelink resource pool, wherein the second control message indicates an index of the base sidelink resource pool.

3. The method of claim 1, further comprising:
   receiving a third control message granting access to the enhanced sidelink resource pool, wherein transmitting the one or more additional sidelink messages is based at least in part on the third control message granting access to the enhanced sidelink resource pool.

4. The method of claim 1, further comprising:
   transmitting a fourth control message that reserves the resources selected from the enhanced sidelink resource pool, wherein transmitting the one or more additional sidelink messages is based at least in part on reserving the resources selected from the enhanced sidelink resource pool.

5. The method of claim 4, wherein the fourth control message is transmitted on one or more resources of the base sidelink resource pool, or one or more resources of the enhanced sidelink resource pool, or any combination thereof.

6. The method of claim 1, further comprising:
   identifying one or more subsets of sidelink resources within the enhanced sidelink resource pool, wherein each subset of sidelink resources of the one or more subsets of sidelink resources is associated with an index.

7. The method of claim 1, further comprising:
performing a channel access procedure prior to transmitting the one or more additional sidelink messages, wherein transmitting the one or more additional sidelink messages is based at least in part on the channel access procedure being successful.

8. The method of claim 1, further comprising:
identifying a bitmap that indicates one or more resources that are excluded from the enhanced sidelink resource pool, wherein the resources selected from the enhanced sidelink resource pool are based at least in part on the one or more excluded resources.

9. The method of claim 1, further comprising:
identifying a second set of sidelink parameters associated with transmitting the one or more additional sidelink messages using the enhanced sidelink resource pool, wherein the second set of sidelink parameters configure a format of the one or more additional sidelink messages, a starting symbol of the one or more additional sidelink messages, or a threshold number of symbols in a slot for the one or more additional sidelink messages, or any combination thereof.

10. The method of claim 1, wherein the identifying the enhanced sidelink resource pool is based at least in part on a coverage status of the UE, or a type of the UE, or a capability of the UE, or any combination thereof.

11. The method of claim 1, further comprising:
identifying a transmission configuration from a set of one or more transmission configurations for transmitting the one or more additional sidelink messages on the resources selected from the enhanced sidelink resource pool, each transmission configuration of the set of one or more transmission configurations comprising one or more resource patterns for the resources selected from the enhanced sidelink resource pool, wherein transmitting the one or more additional sidelink messages is based at least in part on the identified transmission configuration.

12. The method of claim 1, further comprising:
receiving a fifth control message indicating a format of the one or more additional sidelink messages, or a type of the one or more additional sidelink messages, or any combination thereof, wherein transmitting the one or more additional sidelink messages is based at least in part on the format of the one or more additional sidelink messages, or the type of the one or more additional sidelink messages, or any combination thereof.

13. The method of claim 1, further comprising:
identifying a second set of one or more sidelink resources from the base sidelink resource pool based at least in part on the first set of sidelink parameters, the second set of one or more sidelink resources being unavailable for sidelink shared channel transmissions; and
and transmitting the one or more additional sidelink messages on resources selected from the second set of one or more sidelink resources.

14. The method of claim 13, further comprising:
receiving, on resources associated with the base sidelink resource pool, a sixth control message reserving the second set of one or more sidelink resources for the one or more additional sidelink messages, wherein the second set of one or more sidelink resources are identified based at least in part on the sixth control message reserving the second set of one or more sidelink resources.

15. The method of claim 13, wherein the second set of one or more sidelink resources has a periodicity associated with a sidelink feedback channel.

16. The method of claim 1, further comprising:
identifying a set of resources configured for transmitting one or more sidelink control messages, wherein the set of resources is identified based at least in part on the base sidelink resource pool, or the enhanced sidelink resource pool, or any combination thereof, and
transmitting the one or more sidelink control messages on the set of resources.

17. The method of claim 16, further comprising:
receiving an indication of a bitmap that indicates the set of resources associated with transmitting the one or more sidelink control messages, the set of resources being excluded from the base sidelink resource pool, wherein the set of resources are identified based at least in part on the bitmap.

18. The method of claim 16, further comprising:
receiving an indication of a bitmap that indicates the set of resources associated with transmitting the one or more sidelink control messages, the set of resources comprising a subset of resources from the base sidelink resource pool, wherein the set of resources are identified based at least in part on the bitmap.

19. The method of claim 16, wherein a sidelink control message of the one or more sidelink control messages comprises a bitmap indicating time domain resources, frequency domain resources, a resource periodicity, or any combination thereof, the sidelink control message provides control information associated with resources in the base sidelink resource pool, in a third sidelink resource pool, or any combination thereof, based at least in part on the bitmap.

20. The method of claim 1, wherein the one or more additional sidelink messages comprise a sidelink data transmission, a frame structure comprises the resources selected from the enhanced sidelink resource pool and one or more resources from the base sidelink resource pool.

21. The method of claim 1, wherein the set of one or more sidelink resources of the enhanced sidelink resource pool comprises:
a first subset of one or more sidelink resources comprising one or more slots excluded from the base sidelink resource pool; and
a second subset of one or more sidelink resources comprising one or more symbols of a slot that are excluded from the base sidelink resource pool.

22. The method of claim 1, wherein the one or more additional sidelink messages comprise sidelink control information, a repetition of sidelink control information, a channel state information report, a scheduling request, a buffer status report, a discovery message, a link recovery request, a feedback message, a UE-coordination message, a group reservation, or any combination thereof.

23. The method of claim 1, wherein the first set of sidelink parameters comprises at least a first parameter and a second parameter, the first parameter indicates a starting symbol used for transmitting the one or more sidelink messages in a slot and the second parameter indicates a number of symbols for transmitting the one or more sidelink messages in the slot.

24. An apparatus for wireless communications at a first user equipment (UE), comprising:
a processor;

memory coupled with the processor; and instructions stored in the memory and executable by the processor to cause the apparatus to:

receive a first control message indicating a configuration of a first set of sidelink parameters for transmitting one or more sidelink messages;

identify a base sidelink resource pool for transmitting the one or more sidelink messages;

identify an enhanced sidelink resource pool that is different from the base sidelink resource pool, the enhanced sidelink resource pool for transmitting one or more additional sidelink messages, wherein the enhanced sidelink resource pool is identified based at least in part on the first set of sidelink parameters, and wherein the enhanced sidelink resource pool comprises a set of one or more sidelink resources that are excluded from the base sidelink resource pool; and transmit the one or more additional sidelink messages on resources selected from the enhanced sidelink resource pool.

25. The apparatus of claim 24, wherein the instructions to transmit the one or more additional sidelink messages are executable by the processor to cause the apparatus to:

transmit a second control message on one or more resources selected from the enhanced sidelink resource pool, the second control message being associated with one or more resources in the base sidelink resource pool, wherein the second control message indicates an index of the base sidelink resource pool.

26. The apparatus of claim 24, wherein the instructions are further executable by the processor to cause the apparatus to:

receive a third control message granting access to the enhanced sidelink resource pool, wherein transmitting the one or more additional sidelink messages is based at least in part on the third control message granting access to the enhanced sidelink resource pool.

27. The apparatus of claim 24, wherein the instructions are further executable by the processor to cause the apparatus to:

transmit a fourth control message that reserves the resources selected from the enhanced sidelink resource pool, wherein transmitting the one or more additional sidelink messages is based at least in part on reserving the resources selected from the enhanced sidelink resource pool.

28. The apparatus of claim 27, wherein the fourth control message is transmitted on one or more resources of the base sidelink resource pool, or one or more resources of the enhanced sidelink resource pool, or any combination thereof.

29. An apparatus for wireless communications at a first user equipment (UE), comprising:

means for receiving a first control message indicating a configuration of a first set of sidelink parameters for transmitting one or more sidelink messages;

means for identifying a base sidelink resource pool for transmitting the one or more sidelink messages;

means for identifying an enhanced sidelink resource pool that is different from the base sidelink resource pool, the enhanced sidelink resource pool for transmitting one or more additional sidelink messages, wherein the enhanced sidelink resource pool is identified based at least in part on the first set of sidelink parameters, and wherein the enhanced sidelink resource pool comprises a set of one or more sidelink resources that are excluded from the base sidelink resource pool; and means for transmitting the one or more additional sidelink messages on resources selected from the enhanced sidelink resource pool.

30. A non-transitory computer-readable medium storing code for wireless communications at a first user equipment (UE), the code comprising instructions executable by a processor to:

receive a first control message indicating a configuration of a first set of sidelink parameters for transmitting one or more sidelink messages;

identify a base sidelink resource pool for transmitting the one or more sidelink messages;

identify an enhanced sidelink resource pool that is different from the base sidelink resource pool, the enhanced sidelink resource pool for transmitting one or more additional sidelink messages, wherein the enhanced sidelink resource pool is identified based at least in part on the first set of sidelink parameters, and wherein the enhanced sidelink resource pool comprises a set of one or more sidelink resources that are excluded from the base sidelink resource pool; and transmit the one or more additional sidelink messages on resources selected from the enhanced sidelink resource pool.

* * * * *